US010955653B2

(12) United States Patent
Stoppe et al.

(10) Patent No.: US 10,955,653 B2
(45) Date of Patent: Mar. 23, 2021

(54) AUTOFOCUS WITH AN ANGLE-VARIABLE ILLUMINATION

(71) Applicant: Carl Zeiss Microscopy GmbH, Jena (DE)

(72) Inventors: Lars Stoppe, Jena (DE); Thomas Ohrt, Golmsdorf (DE); Christian Dietrich, Jena (DE); Markus Sticker, Jena (DE)

(73) Assignee: Cad Zeiss Microscopy GmbH, Jena (DE)

( * ) Notice: Subject to any disclaimer, the term of this patent is extended or adjusted under 35 U.S.C. 154(b) by 174 days.

(21) Appl. No.: 16/367,789

(22) Filed: Mar. 28, 2019

(65) Prior Publication Data
US 2019/0302440 A1   Oct. 3, 2019

(30) Foreign Application Priority Data

Mar. 28, 2018 (DE) .......................... 102018107356.9

(51) Int. Cl.
*G02B 21/36* (2006.01)
*G02B 21/24* (2006.01)
*G01N 21/88* (2006.01)
*G02B 21/06* (2006.01)

(52) U.S. Cl.
CPC ....... *G02B 21/245* (2013.01); *G01N 21/8806* (2013.01); *G02B 21/06* (2013.01); *G02B 21/244* (2013.01); *G02B 21/365* (2013.01); *G01N 2201/061* (2013.01); *G01N 2201/068* (2013.01)

(58) Field of Classification Search
CPC .................................................. G02B 21/245
See application file for complete search history.

(56) References Cited

U.S. PATENT DOCUMENTS

| 9,494,529 | B1 | 11/2016 | Fresquet et al. |
| 10,670,387 | B2 | 6/2020 | Stoppe et al. |
| 2015/0323787 | A1 | 11/2015 | Yuste et al. |
| 2016/0018632 | A1 | 1/2016 | Gareau |
| 2017/0024859 | A1 | 1/2017 | Schnitzler et al. |
| 2017/0199367 | A1 | 7/2017 | Müller |
| 2018/0329194 | A1* | 11/2018 | Small ................ G02B 7/36 |
| 2019/0146204 | A1 | 5/2019 | Stoppe et al. |

(Continued)

FOREIGN PATENT DOCUMENTS

| DE | 102012223128 | 6/2014 |
| DE | 102014109687 | 1/2016 |
| DE | 102014215095 | 2/2016 |

(Continued)

OTHER PUBLICATIONS

Notice of Reasons for Rejection and English language translation, JP Application No. 2019-050335, dated Jan. 7, 2020, 9 pp.

(Continued)

*Primary Examiner* — Thanh Luu
(74) *Attorney, Agent, or Firm* — Myers Bigel, P.A.

(57) ABSTRACT

Various aspects of the invention relate to techniques to facilitate autofocus techniques for a test object by means of an angle-variable illumination. Here, image datasets are captured at a multiplicity of angle-variable illumination geometries. The captured image datsets are evaluated in order to determine the Z-position.

22 Claims, 12 Drawing Sheets

(56) References Cited

U.S. PATENT DOCUMENTS

2019/0285401 A1    9/2019   Stoppe et al.

FOREIGN PATENT DOCUMENTS

| DE | 102014112666 | 3/2016 |
|----|--------------|--------|
| DE | 102014113256 | 3/2016 |
| EP | 0991934      | 3/2004 |
| EP | 3121637      | 1/2017 |
| JP | 2003-57552 A | 2/2003 |
| JP | 2004-163499 A | 6/2004 |
| WO | 2017/081539  | 5/2017 |

OTHER PUBLICATIONS

European Partial Search Report corresponding to EP 19164289.1, dated Sep. 12, 2019, 19 pp.

* cited by examiner

AUTOFOCUS WITH AN ANGLE-VARIABLE ILLUMINATION

CROSS REFERENCE TO RELATED APPLICATIONS

This U.S. non-provisional patent application claims priority under 35 USC § 119 to German Patent Application No. 102018107356.9, filed on Mar. 28, 2018, the disclosure of which is incorporated herein in its entirety by reference.

TECHNICAL FIELD

Various examples of the invention relate, in general, to capturing a multiplicity of image datasets in a multiplicity of angle-variable illumination geometries and correspondingly setting a Z-position of a specimen stage of a microscope. Various examples of the invention relate, in particular, to setting the Z-position with an increased accuracy.

BACKGROUND

Angle-variable illumination of a test object is used in various applications within the scope of microscopy imaging. Here, angle-variable illumination geometries are used for illuminating the test object, said illumination geometries having a luminous intensity that varies with the angle of incidence. By way of example, the test object can be illuminated from one or more selected illumination angles or illumination directions. The angle-variable illumination is sometimes also referred to as angle-selective illumination or illumination that is structured as a function of the angle.

In principle, the angle-variable illumination can be combined with very different use cases. A typical use case is the Z-positioning of a specimen stage, for example in order to focus a test object arranged on the specimen stage. Such a method is known from, for instance, DE 10 2014 109 687 A1.

However, a restricted reliability and/or accuracy was often observed in conjunction with such autofocus techniques. This is often due to interference structures that are reproduced by the captured image datasets in addition to the test object. Moreover, this may be a specimen with a weak contrast, having little absorption and little phase angle deviation. In this way, the signal that is obtainable from the specimen is restricted. Then, there often is no separation, or only insufficient separation, between the reproduction of the test object on the one hand and the interference structures on the other hand; this makes the determination of an object shift in the image datasets as a basis for setting the Z-position impossible or wrong or only possible with insufficient accuracy. Then, autofocusing may fail or be imprecise.

SUMMARY

Therefore, there is a need for improved techniques for Z-positioning with angle-variable illumination. In particular, there is a need for techniques that facilitate Z-positioning with great reliability and high accuracy.

This object is achieved by the features of the independent patent claims. The features of the dependent patent claims define embodiments.

A method for operating a microscope comprises capturing at least one image dataset in a multiplicity of angle-variable illumination geometries. The method further comprises carrying out a separation of a reproduction of a test object from interference structures in the at least one image dataset. Here, carrying out the separation is based on control data indicative for a priori knowledge. On the basis of the separation, the method then further comprises recognizing components in the image dataset that are change in relation to a change in the angle-variable illumination geometry. This yields an object shift of the test object. Moreover, the method comprises determining a defocus position of the test object on the basis of the object shift. The method comprises setting a Z-position of a specimen stage of the microscope on the basis of the defocus position.

Here, in general, the Z-position denotes positioning of the specimen stage parallel to an optical axis of the microscope. The lateral directions, i.e., perpendicular to the optical axis, are typically described by the X-position and Y-position. The defocus position of the test object can be changed by varying the Z-position.

Here, different techniques for capturing at least one image dataset in the multiplicity of angle-variable illumination geometries can generally be carried out.

By way of example, for the purposes of capturing the at least one image dataset in the multiplicity of angle-variable illumination geometries, the method may comprise: actuating an illumination module with a multiplicity of separately switchable light sources. Then, every illumination geometry may be associated with one or more activated light sources. As a result of this, the different illumination geometries can comprise different illumination angles—from which the test object arranged on the specimen stage is illuminated. Expressed differently, the light intensity varies as a function of the angle of incidence from illumination geometry to illumination geometry.

An adjustable stop is used in a further option, with the stop being arranged in front of an extended light source or in a plane mapped to the light source, for example. By way of example, the adjustable stop could be formed by liquid-crystal matrix or as a DMD (digital micromirror device) apparatus.

As a general rule, it would be possible that, for each angle-variable illumination geometry, the intensity across the test object is constant. In other words, the angle-variable illumination geometry may provide a full-area illumination where the illumination covers an area that is larger than the object.

For the purposes of capturing the at least one image dataset in the multiplicity of angle-variable illumination geometries, the method may comprise: actuating a detector that provides the image datasets.

Capturing the at least one image dataset may already comprise pre-processing of the at least one image dataset as well. By way of example, a normalization could be carried out, for instance by virtue of subtracting a mean contrast, etc. By way of example, the histogram could be spread for increasing the contrast.

By way of example, a multiplicity of image datasets could be captured. By way of example, an associated image dataset could be captured for each illumination geometry. However, in other examples, more than one illumination geometry could be applied in superimposed fashion in each image dataset. In the process, for example, a first illumination geometry could correspond to a first illumination direction and a second illumination geometry could correspond to a second illumination direction; here, for example, these illumination geometries could be applied at the same time, i.e. contemporaneously.

As a general rule, image datasets in the techniques described herein can be captured in transmitted light geometry or reflected light geometry. This means that the specimen stage can be arranged between the illumination module and the detector (transmitted light geometry) or that the illumination module and the detector are arranged on the same side of the specimen stage (reflected light geometry).

The detector or an associated imaging optical unit may have a detector aperture that limits the field region of the light imaged on a sensitive surface of the detector. If the illumination geometry comprises an illumination angle that directly passes without scattering through the detector aperture from the illumination module, this corresponds to bright-field imaging. Otherwise, dark-field imaging is used. As a general rule, the illumination geometries used in the various techniques described herein can be configured for bright-field imaging and/or for dark-field imaging.

The defocus position of the test object could furthermore be determined on the basis of at least one optical system parameter of the microscope.

Different kinds and types of interference structures can be taken into account in the various examples described herein. Examples of interference structures comprise: light reflections; shadowing; effects on account of contaminations, for example in the region of the specimen stage or else in static regions of an imaging optical unit of the microscope; sensor noise of the detector; etc. By way of example, examples of interference structures comprise effects on account of dust particles lying on or near the camera or on an interface of the specimen stage in the optical system of the microscope. Typically, such and other interference structures contribute with significant contrast to the image dataset creation of the multiplicity of image datasets. This makes evaluating physical information items in the context of the test object more difficult. However, the techniques described herein make it possible to carry out a separation of the interference structures from the reproduction of the test object.

As a general rule, the techniques described herein can serve to image different kinds and types of test objects. By way of example, it would be possible to measure test objects with a large phase component; here, a phase offset of the light passing through the test object is typically brought about but there typically is no attenuation, or only a slight attenuation, of the amplitude of the light. However, amplitude test objects could also be measured in other examples, with significant absorption being observed in this case.

The object shift can describe the change in the position of the reproduction of the test object depending on the employed illumination geometry. By way of example, using different illumination angles may result in different positions of the reproduction of the test object. The corresponding distance between the reproductions of the test object can denote the object shift.

The a priori knowledge or the corresponding control data, may be present before capturing the multiplicity of image datasets or, in general, before carrying out the imaging. The a priori knowledge can be established on the basis of determined boundary conditions or on the basis of an associated system state of the microscope. Thus, the a priori knowledge can be based on the imaging in certain circumstances. The a priori knowledge can be derived from other circumstances than the measurement itself.

By way of example, the a priori knowledge could be user-related. For instance, it would be possible for the control data to be obtained from a user interface, and hence from a user of the microscope. By way of example, this could allow the user to predetermine the kind or type of test object to be used. As an alternative or in addition thereto, the user could also specify one or more system parameters of the microscope. This allows the boundary conditions of the measurement to be flexibly specified by the user. Typically, this can achieve great accuracy during the separation; on the other hand, the semi-automatic nature may be disadvantageous in view of the reliability of the method.

In other examples, establishing the control data in this semi-automatic fashion could be complemented or replaced by a fully-automatic establishment of the control data. By way of example, it would be possible for the control data to be obtained from a trained classifier. Here, the trained classifier can operate on the multiplicity of image datasets. This means that the classifier recognizes certain properties of the multiplicity of image datasets and is able to assign these to predefined classes. In such an example, the classifier model of the classifier can implement the a priori knowledge required to carry out the separation of the reproduction of the test object from the interference structures. By way of example, such an implementation can facilitate the separation in particularly reliable fashion if the kind and type of interference structures and the kind and type of test object remain the same in different imaging processes—and hence accurate training of the classifier for the purposes of obtaining an accurate classifier model is facilitated.

A reliable separation of the reproduction of the test object from the interference structures can be achieved by taking account of the a priori knowledge. As a result of this, the object shift of the test object can be determined particularly accurately in turn. This is because, in particular, what this can achieve is that the interference structures—even though they may be contained in the at least one image dataset—are not taken into account, or only taken into account to small extent, when determining the defocus position of the test object. In particular, this may also be achieved in those cases in which the test object itself only has a comparatively low contrast in the multiplicity of image datasets, as is typically the case, for example, for phase test-objects such as, e.g., specifically prepared cells or transmissive cell membranes.

Such techniques may be helpful, particularly in the context of setting the Z-position of the specimen stage for autofocus techniques. Here, the defocus position of the test object is minimized by suitable setting of the Z-position. In particular, it is possible to apply autofocus tracking techniques, in which the Z-position of the specimen stage should be set in suitable fashion over an extended period of time—e.g., minutes or hours, for example in the context of a long-term measurement—in order to keep the test object in the focal plane of the optical system. Here, for long-term measurements, stable and accurate and robust autofocusing is necessary. Even particularly small changes in the defocus position of the test object should be reliably detected. In such scenarios, the techniques described herein can facilitate an effective separation of the reproduction of the test object from the interference structures, and hence a reliable determination of the defocus position.

In principle, techniques for determining the defocus position and for setting the Z-position are known from: DE 10 2014 109 687 A1. Such techniques may also be combined in conjunction with the implementations described herein.

In some variants, the a priori knowledge may comprise at least one direction of the object shift in the at least one image dataset.

Taking account of the direction of the object shift in this way is advantageous in that changes in other directions can be filtered out. As a result, the separation of reproduction of the test object and the interference structures can be implemented particularly accurately.

By way of example, the direction of the object shift can be predicted on the basis of the employed light sources or, in general, on the basis of the illumination module. By way of example, a geometric arrangement of the light sources can be taken into account. Thus, for instance, it would be possible for the method furthermore to comprise determining the at least one direction of the object shift on the basis of a relative positioning of light sources of the illumination module, said light sources being associated with the multiplicity of angle-variable illumination geometries.

By way of example, a first image dataset of a multiplicity of image datasets could be captured in an angle-variable illumination geometry that corresponds to the illumination of the test object by a first light-emitting diode of the illumination module. This may correspond to a first illumination angle. A second image dataset of the multiplicity of image datasets could be captured in an angle-variable illumination geometry that corresponds to the illumination of the test object by a second light-emitting diode of the illumination module. This may correspond to a second illumination angle. Then, a geometric connecting line between the first light-emitting diode and the second light-emitting diode could have a certain orientation, which also defines the direction of the object shift between the first image dataset and the second image dataset.

In principle, the evaluation for recognizing the object shift of the test object can be implemented by a correlation. Here, for example, a pairwise correlation can be carried out between the image datasets of a multiplicity of captured image datasets. By way of example, a 2-D correlation can be carried out. Then, it would be possible to select those data points of the correlation that correspond to the at least one direction of the object shift. By way of example, such a selection can be implemented in a correlation matrix. Other data points of the correlation can be discarded. This implements the separation between the reproduction of the test object on the one hand and the interference structures on the other hand. Then, the object shift can be recognized on the basis of the selected data points.

As a general rule, the correlation can be carried out between different image datasets of a multiplicity of image datasets (sometimes also referred to as cross-correlation) or else on a single image dataset (sometimes referred to as autocorrelation).

Since only a subset of the data points are taken into account for recognizing the object shift on the basis of the a priori knowledge, it is possible to narrow the search space by virtue of discarding non-relevant data points. Filtering becomes possible. This increases the reliability with which the object shift of the test object can be recognized.

In particular, this would render possible a 1-D evaluation of the correlation along the at least one direction for appropriately selected data points instead of a 2-D evaluation of the correlation—e.g., in both lateral directions perpendicular to the optical axis. Expressed differently, these selected data points can be arranged along a straight line that extends through the centre of the correlation (no shift between the two considered image datasets) and that has an orientation according to the corresponding direction of the at least one direction.

Further, the method could comprise selecting first data points of the correlation. The first data points may correspond to a first direction of the at least one direction. Further, the method can comprise selecting second data points of the correlation. The second data points may correspond to a second direction of the at least one direction. Here, the second direction may differ from the first direction. The method may also comprise superimposing the first data points and the second data points. By way of example, a sum of the first data points and the second data points could be formed, wherein, for example, those data points which have the same distance from the centre of the correlation, i.e., which correspond to the same object shifts between the first image dataset and the second image dataset, are summed with one another. Then, the object shift could be recognized on the basis of the selected and superimposed data points.

By taking account of the plurality of directions in this way, it is possible to take account of the plurality of light sources of the illumination module in conjunction with the employed illumination geometries. Thus, a plurality of illumination angles can be taken into account in each illumination geometry. A signal-to-noise ratio can be increased in turn by the superimposition of data points.

Not all variants require the a priori knowledge to comprise the at least one direction of the object shift. The a priori knowledge could, alternatively or additionally, also contain other information items in other examples. By way of example, the a priori knowledge could comprise the reproduction positions of the interference structures in one example; as an alternative or in addition thereto, the a priori knowledge could also comprise a reproduction position of the test object, for example. By way of example, such an implementation can be desirable if the interference structures are identified by means of a trained classifier and/or if the test object is identified by means of a trained classifier. Marking the reproduction positions of interfering structures by the user by way of a user interface can also be promoted by such an implementation of the a priori knowledge.

The various image datasets could be decomposed into regions that are subsequently combined with one another by calculation in order to recognize the object shift of the test object in such a variant, in particular. Such a technique can also be referred to as tiling. Thus, in general, it would be possible to apply tiling to the at least one image dataset dataset depending on the reproduction positions of the interference structures. Then, the evaluation of the at least one image dataset could be suppressed in those image dataset tiles that contain the interference structures. The tiling can promote the separation of the reproduction of the test object from the interference structures.

Different techniques can be used to identify the interference structures and hence determine the reproduction positions of the interference structures and/or to separate the reproduction of the test object from the interference structures. By way of example, the test object could be moved, for instance in the z-direction; stationary interference structures not attached to the specimen stage would then be stationary and could be identified by forming differences. Thus, reference measurements could be resorted to in general, in which an image dataset is captured without test object or, in general, with a variable test object, for instance in a calibration phase prior to the actual measurement. Then, the interference structures caused by the imaging optical unit of the optical system could be identified in a corresponding reference image dataset. A further option for recognizing the interference structures—that is alternatively or additionally employable—comprises the use of control data that are indicative for the contrast of the interference structures in the multiplicity of image datasets. This means that the a priori knowledge can comprise a contrast of the interference structures in the image datasets. By way of example, the a priori knowledge could comprise the contrast of the interference structure in relative terms, in relation to the contrast of the reproduction of the test object. By way of example, such techniques are able to take account of a kind or type of the interference structures. By way of example, when imaging phase objects such as adherent cells, for instance, the contrast of the corresponding test object could be comparatively small, while the contrast of the interference structures can be larger. In a further implementation—in which the control data are received by the user interface—the user could mark the reproduction positions of the interference structures. In an even further implementation, the contrast, for example, could be taken into account in conjunction with the signal-to-noise ratio, too: by way of example, a pairwise correlation between image datasets of the multiplicity of image datasets can be carried out and a correlation maximum in the correlation can be recognized in each case. Then, a requirement may be that the correlation maximum does not exceed or drop below a certain threshold. By way of example, the threshold can be set on the basis of the contrast of the interference structures. Such correlation maxima with particularly large values can be discarded for low-contrast test objects as these maxima then correspond to the interference structures. Thus, in general, at least one recognized correlation maximum of the correlation can be discarded on the basis of the contrast of the interfering structures, or else it can be maintained and taken into account for recognizing the object shift. A further option comprises an algorithm or an elimination of the interference structures by a calibration, in a manner similar to shading correction. By way of example, in conjunction with tiling, it would be possible to suppress an evaluation of the multiplicity of image datasets in those image dataset tiles of the tiling that contain the interference structures.

In a further example, the a priori knowledge could also comprise a search region for the object shift. This may mean that the distance of the reproductions of the test object for two different illumination geometries can be restricted by the search region. An upper limit and/or a lower limit can be defined. Here, the search region may also be repeatedly adapted during a plurality of iterations of a Z-positioning; this means that the search region can be adapted from iteration to iteration. Thus, in particular, the a priori knowledge may comprise the search region as a function of the iteration. This renders it possible, in particular, to take account of the fact that the magnitude of defocussing—and hence the anticipated object shift—can typically vary from iteration to iteration. By way of example, the assumption that large defocusing is present can be made at the start of an autofocus tracking method. However, only little defocusing is typically still present after autofocusing has been implemented by carrying out one or more initial iterations. This can be taken into account when dimensioning the search region or the thresholds associated therewith. As an alternative or in addition to such a dependence on the iteration of the Z-positioning, the search region can also have a dependence on the depth-of-field range of the imaging optical unit of the microscope.

In an even further example, the a priori knowledge may comprise a real space periodicity of the test object. This is based on the discovery that, for example, technical specimens in particular—for example, semiconductor chipsets, textiles, materials samples, etc.—often have a texture or topology with significant periodic components. This may be captured by the a priori knowledge. As a result of this, the object shift on account of changing illumination geometries can be reliably distinguished from artefacts with a similar appearance on account of the real space periodicity. In particular, it would be possible, for example, for the a priori knowledge to comprise one or more directions of the real space periodicity. Then, the illumination geometries can be chosen in a manner complementary thereto such that mistaken identification is avoided. A more reliable separation of the reproduction of the test object from the interference structures is rendered possible.

Techniques based on taking account of a priori knowledge when separating the reproduction of the test object from the interference structures were predominantly described above. In particular, such techniques can be helpful when it is possible to anticipate certain properties of the imaging on the basis of the control data. As an alternative or in addition thereto, it would also possible to implement reference measurements in further examples. By way of example, such reference measurements could be arranged in nested fashion with the capture of the multiplicity of image datasets within the period of time; this can achieve a reliable separation of the reproduction of the test object from the interference structures, even in conjunction with long-term measurements. Drifts can be avoided. Moreover, it is possible to avoid systematic inaccuracies, for example on account of errors in the a priori knowledge. Such techniques are described in more detail below. Such techniques can be combined with the techniques described above which, for example, relate to the use of a priori knowledge for separating the reproduction of the test object from the interference structures.

A method for operating a microscope comprises capturing at least one image dataset in a multiplicity of angle-variable illumination geometries. The method also comprises capturing a multiplicity of reference image datasets in a multiplicity of Z-positions of a specimen stage of the microscope. Further, the method comprises recognizing components in the multiplicity of reference image datasets that are static (i.e., unchanging or fixed) in relation to a variation of the Z-position as interference structures. The method further comprises carrying out a separation of an reproduction of a test object from the recognized interference structures in the at least one image dataset. The method also comprises recognizing components in the at least one image dataset that change in relation to a change in the angle-variable illumination geometry as an object shift of the test object; this is based on the separation. The method also comprises determining a defocus position of the test object on the basis of the object shift and setting a Z-position of a specimen stage of the microscope on the basis of the defocus position.

Thus, such techniques allow the reduction or suppression of influences of interference structures whose cause—such as, e.g., particles of dust, etc.—is not moved together with the specimen stage, i.e., which are not part of the test object or the specimen stage, for example. Thus, the reference measurements complement the angle-variable illumination by an additional repositioning of the specimen stage.

Here, it would be possible, in principle, for the at least one image dataset and the multiplicity of reference image datasets to be captured independently of one another. By way of example, no illumination geometry or a different illumination geometry than for the at least one image dataset could be used for the reference image datasets. However, in other examples, it would be possible for the at least one reference image dataset or some of the reference image datasets of the multiplicity of reference image datasets to correspond to the at least one image dataset. This may mean that, for example, the same illumination geometry (illumination geometries) and/or the same Z-position is used for the corresponding image datasets. As a result, the time outlay for the measurement can be reduced because corresponding image datasets need not be captured twice.

Thus, such applications need not necessarily resort to a priori knowledge. Instead, a reproduction position of the interference structures can be established dynamically with the aid of the reference measurement.

Here, very different techniques for carrying out the separation of the reproduction of the test object from the interference structures may be used in such implementations. By way of example, the interference structures could be removed from the various image datasets of the multiplicity of image datasets. To this end, tiling could once again be used, for example. Then, those image dataset tiles that contain the interference structures could be discarded. By way of example, such tiles could be deleted or be ignored during the evaluation or be damped by a factor or be replaced by a suitable value.

In a further example, in turn, it would be possible for the method to furthermore comprise carrying out a correlation of the multiplicity of image datasets. Then, those data points based on the interference structures could be discarded or ignored in this correlation. By way of example, it would also be possible in this context for a correlation to be carried out on the multiplicity of reference image datasets. Then, the correlation of the at least one image dataset could be compared to the correlation of the multiplicity of reference image datasets: the interference structures can subsequently be recognized on the basis of this comparison. By way of example, the correlation of the multiplicity of image datasets can have a correlation maximum that is caused by the test object, namely by the object shift of the test object, in particular. On the other hand, it would also be possible for the correlation of the multiplicity of reference image datasets to have a correlation maximum caused by the interference structures. Then, the correlation maximum associated with the interference structures may also be contained to a certain degree in the correlation of the multiplicity of image datasets; by comparing the correlation of the multiplicity of image datasets with the correlation of the multiplicity of reference image datasets, it would be possible to implement a corresponding separation. Often, the correlation maximum associated with the interference structures may have a particularly large signal value, for example in comparison with a correlation maximum associated with the test object, in particular.

For instance, capturing the multiplicities of image datasets in the multiplicity of angle-variable illumination geometries and the associated setting of the Z-position could be carried out repeatedly for a multiplicity of iterations. This means that the Z-position can be repeatedly changed over the multiplicity of iterations. By way of example, this can be used for autofocus tracking applications. In such an example it would be possible, for example, for the multiplicity of reference image datasets for a subsequent iteration of the multiplicity of iterations to be obtained on the basis of the at least one image dataset of one or more preceding iterations of the multiplicity of iterations. Expressed differently, this means that the measurement image datasets of earlier iteration(s) can be used as reference image datasets of subsequent iteration(s). By way of example, the profile of the correlation could be used as a reference after setting the desired focal position—if use is made of correlations for determining the object shift, as already described above. Changes in the correlation can be taken into account by virtue of these changes being taken into account within the scope of the comparison of the correlation of the at least one image dataset with the correlation of the multiplicity of reference image datasets. A corresponding background correction can be applied. As a result, it may be possible to dispense with interrupting the (long-term) measurement with a plurality of iterations by dedicated calibration phases. This facilitates a particularly high time resolution of the long-term measurement.

Thus, great robustness for a measurement with a plurality of iterations can be provided in the various examples described herein. Such an effect is also achieved by the method described below.

For each iteration of a multiplicity of iterations, a method for operating a microscope comprises: capturing at least one image dataset in a multiplicity of angle-variable illumination geometries, and recognizing components in the at least one image dataset that change in relation to a change in the angle-variable illumination geometry as an object shift of a test object. For each iteration, the method furthermore comprises determining a defocus position of the test object on the basis of the object shift and, on the basis of the defocussed position, setting a Z-position of a specimen stage of the microscope. Here, the method furthermore comprises adapting the multiplicity of angle-variable illumination geometries between successive iterations.

Thus, the Z-position can be adapted repeatedly by the provision of the multiplicity of iterations. As a result, it is possible to realize autofocus tracking applications, for example for moving test objects. In general, a repetition rate of the plurality of iterations could lie in the range from kHz to Hz or 0.1 Hz. By way of example, the measurement duration can lie in the region of minutes, hours or days.

In general, the illumination geometry can be adapted for each iteration—or else, only for every second or third iteration, or at irregular intervals depending on a trigger criterion, etc.

Here, the accuracy and/or the robustness, with which the object shift can be recognized, can be increased from iteration to iteration by adapting the illumination geometries. In particular, systematic inaccuracies from the use of a static set of illumination geometries over the various iterations can be avoided. This may be helpful, particularly in the context of long-term measurements. Expressed differently, there can thus be an adaptive or flexible use of different illumination geometries. By way of example, the combination of different illumination geometries could facilitate particularly great robustness.

An example for systematic inaccuracies that may result from the use of a static set of illumination geometries is provided below. By way of example, an autofocus application with tracking could be used for an optical grating. The optical grating can be aligned along one axis. Here, the variation in the illumination geometry along this axis cannot provide any significant contrast, although it can provide a high contrast perpendicular thereto. Secondly, the shift of the reproduction position induced by the use of different illumination directions must not correspond to the grating period. Therefore, adapting the illumination geometry both in respect of direction and in respect of intensity may be desirable in such a case.

A capture region for recognizing the object shift could be set in such an example by adapting the illumination geometries. By way of example, if illumination angles of the employed illumination geometries are dimensioned with a small angle in relation to the optical axis, this typically corresponds to a large capture region for the recognizable object shift. This is due to the fact that a comparatively small object shift still is obtained, even for comparatively large defocus positions of the test object.

This is because, as a general rule, a larger (smaller) object shift can be obtained for a larger (smaller) employed illumination angle which the employed illumination directions include with the optical axis, and for larger (smaller) defocus positions of the test object.

Thus, in general, larger angles that are included by the illumination angles of the employed illumination geometries with the optical axis conversely lead to a reduced capture region within which the object shift is recognizable. Secondly, such a scenario results in an increased resolution when determining the Z-position because there is a greater object shift per unit length of the defocus position.

These discoveries can be exploited in conjunction with an advantageous strategy for adapting the multiplicity of angle-variable illumination geometries as a function of the iteration. This is because, for example, the multiplicity of angle-variable illumination geometries could be changed in such a way that a magnitude of the object shift per unit length of the defocus position is changed. According to the principles outlined above, this can be achieved by a tendency of increasing or decreasing illumination angles.

Expressed differently, it is thus possible to change the multiplicity of angle-variable illumination geometries in such a way that the capture region is changed. This is because if, for example, the magnitude of the object shift per unit length of the defocus position adopts a certain value, it is only possible to recognize object shifts up to a certain threshold defocus position—which corresponds to the capture region; larger defocus positions can no longer be imaged on the sensitive surface of the detector or are blocked by the detector apparatus.

By way of example, the employed strategy could contain increasing the magnitude of the object shift per unit length of the defocus position for subsequent iterations. Thus, this means that the capture region is reduced for later iterations. However, as described above, a reduced capture region results in an increased resolution at the same time. Thus, in such an approach, the defocus position could initially be determined approximately using a large capture region; there could then, subsequently, be a finer and higher resolved determination of the defocus position using a restricted capture region. This renders it possible to resolve the trade-off situation between capture region and resolution in a targeted and iteration-dependent fashion.

In further examples, the multiplicity of angle-variable illumination geometries could be changed in such a way that a direction of the object shift is changed. By way of example, for the purposes of implementing illumination directions of the associated illumination geometries, it would be possible to use those light sources of the illumination module in pairwise fashion whose connecting straight lines have different orientations. Thus, in general, different illumination angles could be used from iteration to iteration.

Such a change in the orientation of the employed illumination geometries facilitates a reduction in interference structures that are based on the self-similarity of the test object. By way of example, the test object could, in particular, have certain periodic structures; by way of example, this can be observed, in particular, in the case of technical test objects, for example semiconductor topographies, etc. Such a real space periodicity of the test object is not changed when adapting the multiplicity of angle-variable illumination geometries; at the same time, the 2-D correlation can be rotated or changed by rotating or otherwise changing the direction of the object shift. This renders it possible to robustly separate between interference structures on account of the periodicity of the test object on the one hand and the object shift on account of the angle-resolved illumination geometries on the other hand, for example in conjunction with a correlation. Hence, the Z-position of the specimen stage can be set particularly robustly.

Various techniques described herein are based on reliable determination of the defocus position. Techniques with which the object shift can be robustly recognized were described above. Then, the object shift is taken into account when determining the defocus position—which is why the defocus position, too, can profit from the robust determination of the object shift.

However, it is further possible for the defocus position to be determined based not only on the object shift. Rather, other variables may also be taken into account. By way of example, it may be necessary to take account of one or more optical system parameters of the microscope when determining that the focus position.

It was observed that values of the system parameters, too, may be known only imprecisely or known with errors. In such a case, there is a risk of a systematic falsification when determining the defocus position. The techniques described below render it possible to reliably determine the defocus position, even in view of uncertainties in conjunction with one or more optical system parameters.

For each iteration of a multiplicity of iterations, a method for operating a microscope comprises: capturing at least one image dataset in a multiplicity of angle-variable illumination geometries, and recognizing components in the at least one image dataset that change in relation to a change in the angle-variable illumination geometry as an object shift of a test object. For each iteration, the method furthermore comprises determining a defocus position of the test object on the basis of the object shift and, on the basis of the defocus position, setting a Z-position of a specimen stage of the microscope. Here, the method furthermore comprises determining a change in the defocus position of the test object between two iterations of the multiplicity of iterations on the basis of the recognized object shifts for these two iterations. Moreover, the method comprises determining a change in the Z-position of the specimen stage between the two iterations on the basis of control data of the specimen stage of the microscope. Further, the method also comprises comparing the change in the defocus position with the change in the Z-position.

Thus, it is possible for the Z-position to be repeatedly set for the multiplicity of iterations. By way of example, this may facilitate an autofocus tracking application. A long-term measurement is facilitated. Moving specimens can also be tracked in robust fashion.

An error state of the system can be recognized by comparing the change in the defocus position with the change in the Z-position between the two iterations. This is because, in particular, the change in the Z-position can correspond with, or in any case correlate to, the change in the defocus position in the case of a properly functioning system. By way of example, if the defocus position changes to a lesser or greater extent than the Z-position, the assumption can be made that an error state prevents accurate autofocusing. Appropriate measures can be adopted. Thus, a self-consistency when determining the defocus position on the one hand and when setting the Z-position on the other hand can be verified by such techniques. A self-test is rendered possible. As a result, it is possible to identify systematic errors in conjunction with system parameters, for example.

Here, different measures could be adopted in the various techniques described herein if an error state is recognized. In a simple implementation, a long-term measurement could be terminated, for example, and a corresponding cause of the error could be output or logged. Alternatively or additionally, a warning could also be output to a user via a user interface.

However, there could also be a self-consistent adaptation of the employed techniques in further examples, and so no termination of the measurement is necessary. This is because, for example, the defocus position of the test object could furthermore be determined on the basis of at least one optical system parameter of the microscope. By way of example, the optical system parameter could describe an optical property of an imaging optical unit, etc., of the microscope. By way of example, the at least one optical system parameter could be selected from the following group: magnification; and spacing of an illumination module of the microscope from the specimen stage.

Such techniques are based on the discovery that systematic errors may arise when determining the defocus position in the case of uncertainties in the context of the at least one optical system parameter. By means of the techniques described herein, such systematic errors can be reduced by virtue of a self-consistent adaptation of the at least one optical system parameter being implemented on the basis of the comparison of the change in the defocus position with the change in the Z-position. This is because, by way of example, the at least one optical system parameter could be set in such a way that the measured change in the defocus position corresponds to the change in the Z-position of the specimen stage. Then, a particularly high accuracy in the context of determining the defocus position or setting the Z-position can be obtained for one or more subsequent iterations if the adapted optical system parameter is used.

Such techniques are further based on the discovery that the functionality of the autofocus application can be checked by two independent measurement values: namely, firstly, by measuring the change in the defocus position on the basis of the identified object shift, i.e., on the basis of the multiplicity of image datasets, and, secondly, on the basis of the control data at the specimen stage. By way of example, the specimen stage could have a position sensor configured to output the control data. As an alternative or in addition thereto, the specimen stage could have an actuator that facilitates a motorized adjustment of the specimen stage. Then, the control data could be obtained from the actuator. By way of example, the control data could implement a control signal for the actuator.

The aspects and examples described above can be combined with one another. By way of example, it would be possible to combine techniques based on a priori knowledge with techniques based on the use of reference image datasets. By way of example, the described techniques could be combined in the context of the iterative performance of the measurement with the techniques that facilitate a separation of the interference structures from the reproduction of the test object, for example on the basis of a priori knowledge and/or reference image datasets. Here, the techniques based on the iterative performance of the measurement could contain a self-consistent check and an optional adaptation of one or more optical system parameters from iteration to iteration. The techniques based on the iterative performance of the measurement could also contain an adaptation of the employed illumination geometries from iteration to iteration. In general, all such measures increase the robustness and/or the accuracy with which the Z-position of the specimen stage can be set—for example in the context of an autofocus application.

DETAILED DESCRIPTION

Figure 1:
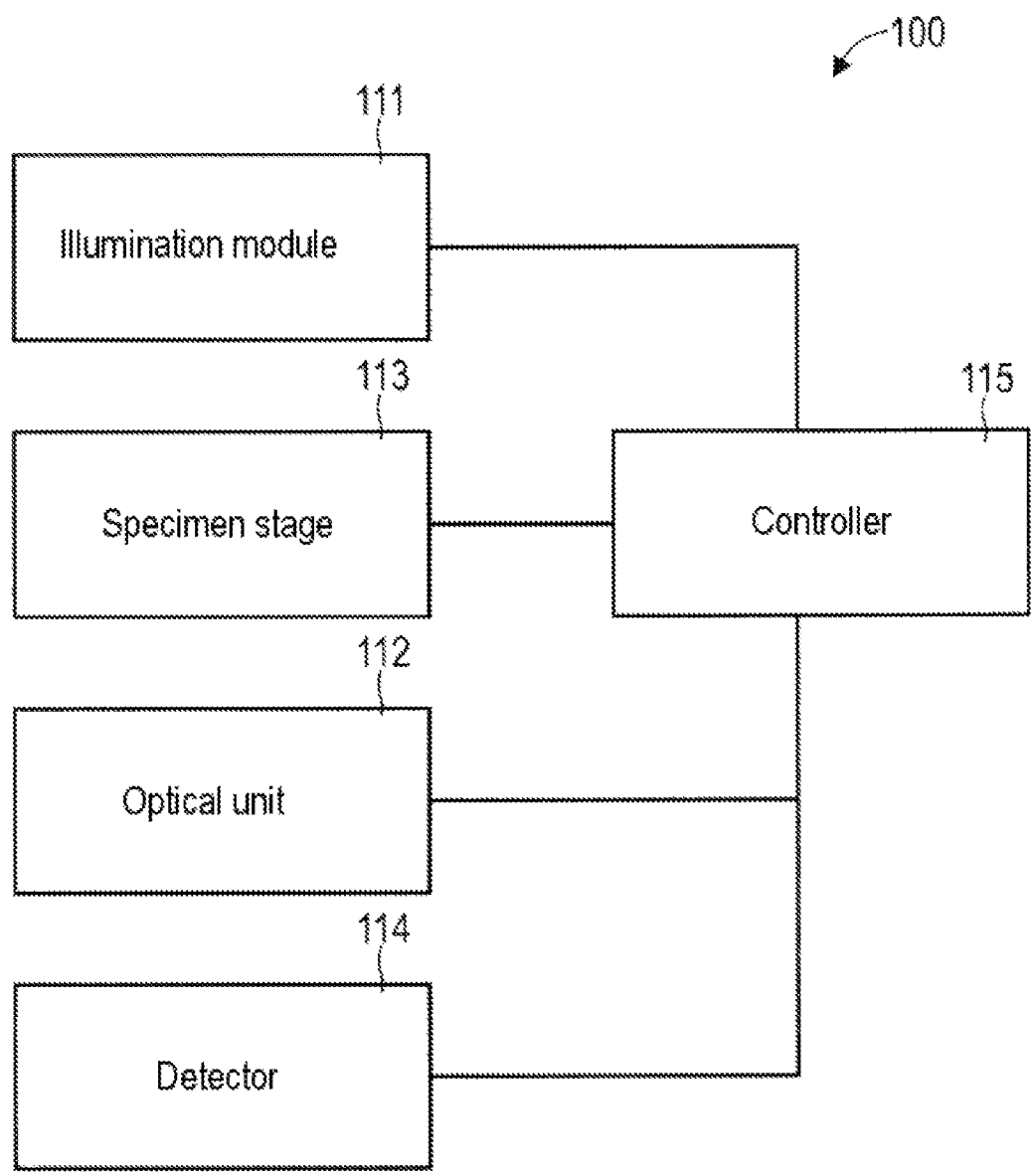
FIG. 1 is a schematic view of a microscope with an illumination module for the angle-variable illumination according to various techniques.

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Connections and couplings between functional units and elements as illustrated in the figures may also be implemented as an indirect connection or coupling. Functional units may be implemented as hardware, software or a combination of hardware and software.

Below, various techniques are described in relation to the angle-variable illumination. In the angle-variable illumination, a test object is illuminated by different illumination geometries. By way of example, the different illumination geometries could comprise different illumination angles or illumination directions. As a result, there is a change in the reproduction of the test object (i.e., the image of the test object generated in the image dataset) in the corresponding image datasets. By way of example, the location of the reproduction of the test object can vary; i.e., there may be an object shift from illumination geometry to illumination geometry, or from image dataset to image dataset. This can be exploited within the scope of a digital analysis in order to obtain additional information items about the test object.

An example of such a digital analysis relates to the determination of the arrangement of the test object in relation to the optical system that is used to provide the angle-resolved illumination, typically a microscope. Here, the arrangement of the test object may denote, for example, the position of the test object in relation to the focal plane of the optical system, i.e., a distance between the test object and the focus plane (defocus position). By way of example, the defocus position can be defined along a direction extending parallel to the principal optical axis of the optical system; typically, this direction is referred to as Z-direction. As an alternative or in addition thereto, the arrangement of the test object could also denote an extent of the test object parallel to the Z-direction, i.e., a thickness of the test object. By way of example, test objects that have three-dimensional bodies and may therefore also have a significant extent along the Z-direction are examined relatively frequently in the field of biotechnology.

In particular, autofocus applications that are based on determining the defocus position can be facilitated using the techniques described herein. In the context of the autofocus applications, the Z-position of a specimen stage fixating the test object can be set. As a result, the defocus position is changed.

Here, the Z-position can be set by providing a suitable instruction by way of a user interface to a user in the various examples described herein. By way of example, the user could be provided with an instruction via the user interface regarding the value of the change in the Z-position of the specimen stage. By way of example, a travel of the Z-position made accessible to a user could be restricted depending on the defocus position. To this end, the user interface could be actuated in a suitable manner. An automated setting of the Z-position would also be possible in other examples. A motorized specimen stage can be used to this end. A suitable actuator can be actuated accordingly using an appropriate control signal.

By way of example, such techniques can be used to stabilize long-term measurements. Long-term measurements may have a measurement duration during which there is a change in the form and/or extent of the test object. By way of example, this would be the case in time-lapse measurements. By way of example, this may be the case for mobile specimens in a 3-D matrix. By way of example, individual constituents of the test object could have high mobility. Moreover, drifts, caused by variations in the temperature or external vibrations, for example, can be compensated. Autofocus tracking is possible.

The defocus position can be determined with increased sensitivity using the techniques described herein. This facilitates robust autofocus applications, even in the context with low-contrast test objects, for example biological specimens.

Interference structures can be identified in the captured image datasets using the techniques described herein. The techniques described herein may render it possible to separate the reproduction of the test object from the interference structures. As a result, a falsifying influence of the interference structures on the determination of the defocus position can be avoided or, in any case, reduced. The capture region for determining the defocus position can be increased.

The complexity of the digital analysis can be reduced by means of the techniques described herein. By way of example, it may be possible to undertake a 1-D analysis of a correlation instead of a 2-D analysis of the correlation. As an alternative or in addition thereto, one or more control parameters of the optical system can be adapted iteratively and in self-consistent fashion and a dedicated calibration phase can therefore be dispensed with.

In various examples, the object shift of the test object is recognized by comparing a multiplicity of image datasets to one another. Here, different techniques can be applied in the context of the comparison. By way of example, image dataset registrations could be undertaken for the various image datasets of the multiplicity of image datasets in order to recognize an reproduction position of the test object in the various image datasets. Then, the reproduction positions could be compared to one another. A correlation between two or more image datasets of the multiplicity of image datasets could also be carried out in other examples. In general, the correlation can be carried out for entire image datasets, or else for portions of the image datasets only, with it not being necessary for identical portions to be taken into account in different image datasets—particularly in the case of extended test objects and/or great defocussing. The correlation can facilitate the quantification of a relationship between reproductions of the test object in different illumination geometries. In particular, the correlation may render it possible to determine distances or shifts between the reproductions of the test object in different illumination geometries. By way of example, the correlation could render possible the identification of those translational shifts that transpose a first reproduction of the test object in a first illumination geometry into a second reproduction of the test object in a second illumination geometry. This is referred to as object shift of the test object.

In some examples, the first reproduction of the test object in the first illumination geometry could be associated with a first image dataset and the second reproduction of the test object in the second illumination geometry could be associated with a second image dataset. In such a case, an exemplary implementation of the correlation would emerge from the following equation:

$$K(T)=\Sigma_n x(n)y(n+T). \tag{1}$$

Here, the value of the correlation can be determined for different shifts T between the first reproduction x and the second reproduction y. A maximum of the correlation is denoted by $T \equiv T_0$, in which the first reproduction and the correspondingly shifted second reproduction have a particularly high similarity. Therefore, $T_0$ is indicative for the distance between the reproductions of the test object in different illumination geometries, i.e., the object shift. n indexes the pixels. Equation 1 describes a 1-D correlation in a simplified fashion, with, in general, it also being possible to carry out a 2-D correlation. Because different image datasets are compared, this type of correlation is sometimes also referred to as a cross-correlation. In other examples, an autocorrelation of a single image dataset may also be carried out with, in this case, a plurality of illumination geometries being able to bring about a superimposition of a plurality of reproductions of the test object. The position of the maximum of the correlation can subsequently be used to determine the defocus position of the test object.

By way of example, the distance between the test object and the focal plane could also be obtained by the following equation:

$$\Delta z = T_0 \frac{\cos\alpha \cdot \cos\beta}{\sin(\alpha+\beta)}, \quad (2)$$

where $\alpha$ and $\beta$ each denote the angle between the illumination directions and the principal optical axis, i.e., the illumination angle. These angles are provided by corresponding optical system parameters, in particular a distance of the illumination module from the specimen stage and the arrangement of the light sources, for example. The principles of corresponding techniques are known from DE 10 2014 109 687 A1, the corresponding disclosure of which is incorporated herein by cross-reference.

Here, Equation 2 only denotes an exemplary implementation of a corresponding calculation. Other formulations of Equation 2 could also be used, in general $$\Delta z = \Delta z(S, T_0) \quad (3)$$

where S denotes one or more system parameters.

As an alternative or in addition to the position of the maximum of the correlation, other characteristics of the correlation could also be used for determining the arrangement of the test object in relation of the focal plane. One example comprises the width of the maximum of the correlation. As a result, it would be possible, for example, to deduce the extent of the test object in relation to the focal plane—by an appropriate application of Equation 2.

Such above-described techniques are particularly flexible and can be adapted depending on the desired implementation. A single image dataset could be recorded in a first example, with two different illumination geometries being activated parallel in time in the process. In this first example, the correlation may also be referred to as an autocorrelation. Here, a distance between the maxima of the autocorrelation corresponds to the defocus position. By way of example, the position of a maximum of the autocorrelation in relation to a zero could also be considered. A single image dataset could be recorded in a further example, with three different illumination geometries being activated in the process. This is why an autocorrelation could be used, with the maximum of the autocorrelation corresponding to the defocus position. In a third example, a plurality of image datasets could be recorded, e.g., sequentially in time or with different wavelengths and/or polarizations of the light, with each image dataset respectively containing an reproduction of the test object in a single illumination geometry. In such an example, the correlation may be referred to as a cross-correlation. Once again, the maximum of the correlation corresponds to the defocus position.

FIG. 1 illustrates an exemplary optical system 100. By way of example, the optical system 100 could implement a microscope, for example a light microscope in transmitted light geometry or else in reflected light geometry.

By means of the microscope 100, it may be possible to present small structures of a test object or specimen object fixated to the specimen stage 113 in magnified fashion.

To this end, the microscope 100 comprises an illumination module 111. The illumination module 111 may be configured to illuminate the entire area of the specimen stage 113, in each case with different illumination geometries.

Moreover, the microscope 110 comprises an imaging optical unit 112, which is configured to produce a reproduction of the test object on a sensor area of the detector 114. A detector aperture may facilitate bright-field imaging and/or dark-field imaging, for example depending on the employed illumination geometry.

In the example of FIG. 1, the illumination module 111 is configured to facilitate an angle-variable illumination of the test object. This means that different illumination geometries of the light employed to illuminate the test object can be implemented by means of the illumination module 111. The different illumination geometries can each comprise one or more reflected illumination directions or illumination angles.

Here, different hardware implementations for providing the different illumination geometries are possible in the various examples described herein. By way of example, the illumination module 111 could comprise a plurality of adjustable light sources, which are configured to locally modify and/or produce light (the light sources are not illustrated in FIG. 1).

A controller 115 can actuate the illumination module 111 or the light sources. By way of example, the controller 115 could be implemented as a microprocessor or microcontroller. As an alternative or in addition thereto, the controller 115 could comprise an FPGA or ASIC, for example. As an alternative or in addition thereto, the controller 115 can also actuate the specimen stage 113, the imaging optical unit 112 and/or the detector 114.

In some examples, the controller 115 can be integrated into a housing of the microscope 100. However, the controller 115 being provided externally to the optical apparatus 100 would also be possible in other examples. By way of example, the controller 115 could be implemented by an appropriate computer program, which is run on a PC.

Figure 2:
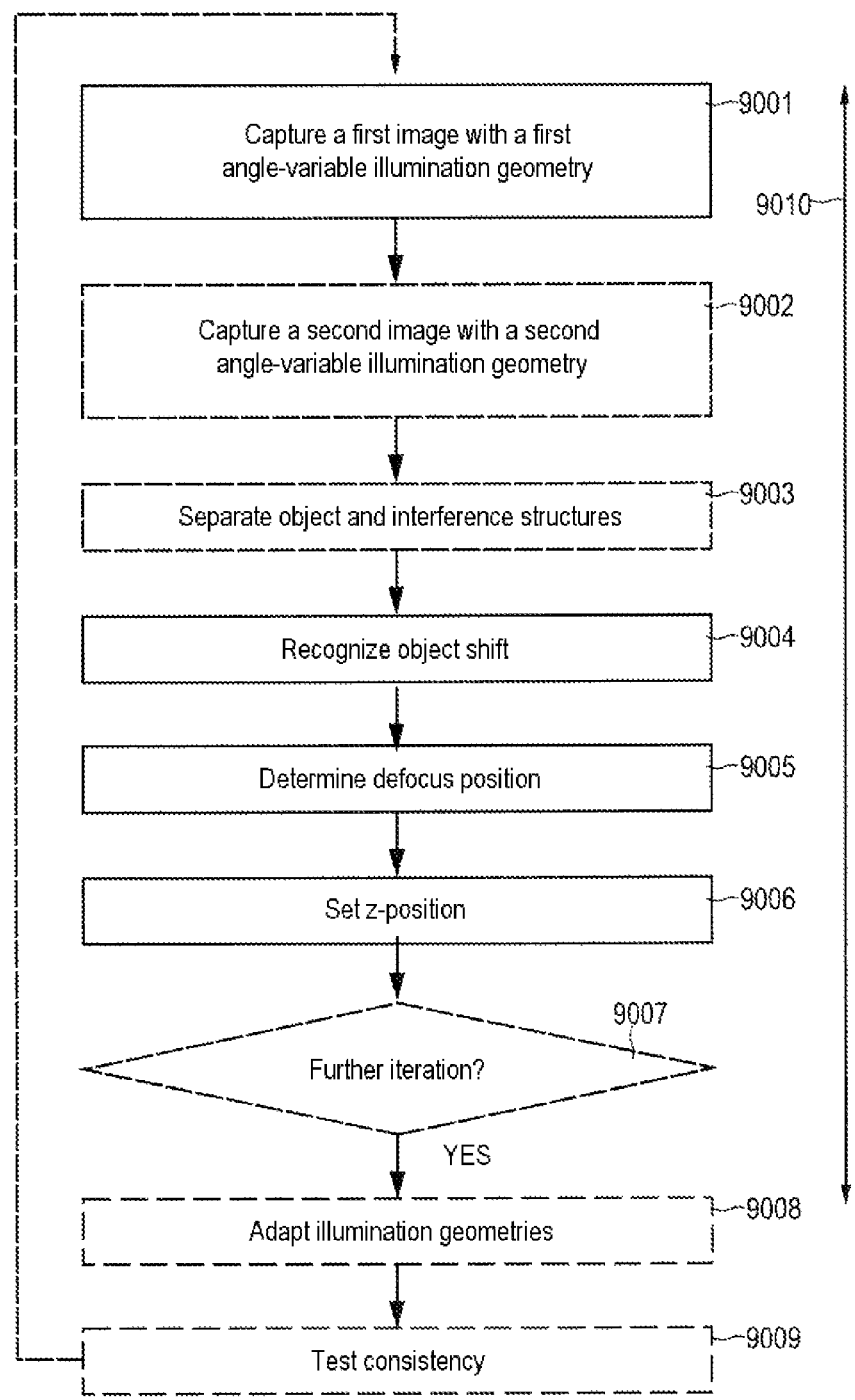
FIG. 2 is a flowchart of an exemplary method.

FIG. 2 is a flowchart of an exemplary method. By way of example, the method according to FIG. 2 could be carried out by the controller 115 of the microscope 100 from FIG. 1. Optional blocks in FIG. 2 are illustrated using dashed lines.

A plurality of iterations 9010 are carried out in succession in FIG. 2.

First, in block 9001, a first image dataset is captured with a first angle-variable illumination geometry. By way of example, the first angle-variable illumination geometry could implement a line pattern of the employed light sources of the illumination module.

By way of example, block 9001 can be implemented by actuating the illumination module and/or the detector of the microscope.

Then, optionally, in block 9002, a second image dataset is captured with a second angle-variable illumination geometry. By way of example, the second angle-variable illumination geometry could implement a further line pattern of the employed light sources of the illumination module.

Typically, such a line pattern defines a multiplicity of illumination angles according to the various employed light sources.

Instead of capturing a second image dataset with the second angle-variable illumination geometry in block 9002, it would also be possible in some examples for two illumination geometries—for example, the line pattern and the further line pattern—to be used in block 9001. Then, there is a superposition in an individual image dataset. Therefore, block 9002 is denoted as optional.

Then, carrying out a separation of a reproduction of the test object from interference structures in the at least one image dataset from blocks 9001 and 9002 is implemented in the optional block 9003.

Here, this separation can be carried out, for example, on the basis of control data indicative for a priori knowledge.

Subsequently, an object shift of the test object is recognized in block 9004, possibly taking account of the separation. This means that interference structures can be not taken into account, or only taken into account to a small extent, when recognizing the object shift. This can ensure that the object shift results from the defocus position of the test object and said object shift does not represent an artefact caused by interference structures.

A 2-D autocorrelation in relation to the image dataset of block 9001 could be carried out in block 9004. Additionally, a 2-D cross-correlation could be carried out between the image datasets of blocks 9001, 9002. In other examples, an image dataset registration could be carried out between the same features in the image datasets of blocks 9001, 9002 in order to determine the object shift.

Then, the defocus position of the test object is determined in block 9005 on the basis of the previously recognized object shift.

The Z-position of the specimen stage of the microscope is set in block 9006, for example in automatic/motor-driven fashion by means of a control signal or else in semi-automatic fashion by outputting instructions by way of a user interface.

The example of FIG. 2 illustrates a scenario in which the capture of the at least one image dataset in blocks 9001 and 9002 in the multiplicity of angle-variable illumination geometries and the associated adjustment of the Z-position in block 9006—or, in general, blocks 9001-9006—are carried out repeatedly for multiplicity of iterations 9010. To this end, a check is carried out in block 9007 as to whether a further iteration 9010 should be carried out. To this end, different termination criteria can be taken into account, for example a counter, timer, etc.

If a further iteration 9010 is intended to be carried out, 9001-9006 are carried out again.

Optionally, the angle-variable illumination geometries could be adapted for the subsequent iteration 9010 in block 9008. By way of example, an adaption could be implemented in such a way that a direction of the object shift is changed. However, a magnitude of the object shift, normalized with respect to the defocus position, could also be changed. By way of example, the magnitude of the object shift per unit length of the defocus position could be increased from iteration to iteration 9010 in order, in this way, to facilitate an approximate determination of the defocus position together with approximate setting of the Z-position, with a large capture region—and subsequently to facilitate a fine, highly resolved determination of the defocus position with a fine setting of the Z-position.

Optionally, a test for self-consistency of the undertaken calculations and adaptations is implemented in block 9009. Here, the object shift of block 9004 on the one hand and the change in the Z-position in the corresponding blocks 9006 on the other hand, recognized in the two preceding iterations, could be compared to one another. In particular, a check can be carried out as to whether the change in the Z-position in blocks 9006 results in an expected change in the object shift in blocks 9004. In particular, an (actual) change in the defocus position can be determined, for example on the basis of the recognized object shifts; said change can be compared to the (expected) change in the defocus position on account of the change in the Z-position by way of the adjustment by means of the specimen stage. There can be a self-consistent adaptation of a system parameter of the microscope 100 in the case of discrepancies. Details in the context of such a self-consistent adaptation are described below in conjunction with FIG. 16.

Figure 3:
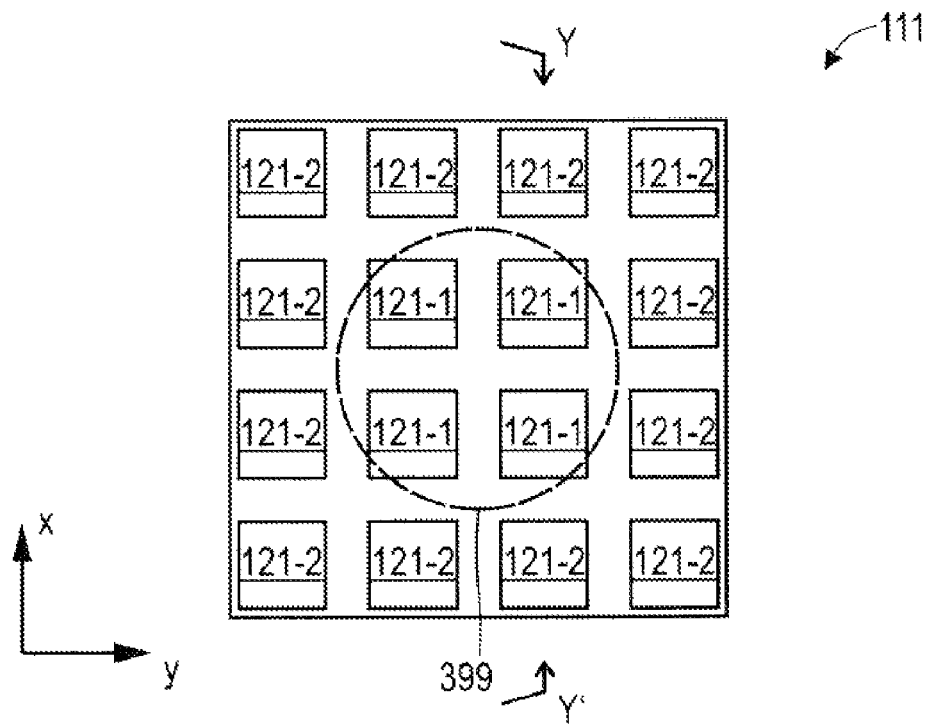
FIG. 3 is a schematic view of the illumination module according to various examples.

FIG. 3 illustrates aspects in relation to the illumination module 111. FIG. 3 illustrates that the illumination module 111 has a multiplicity of adjustable light sources 121-1, 121-2 in a matrix structure. In the example of FIG. 3, the matrix structure is implemented as a grid structure with a square unit cell. Here, the matrix structure is oriented in a plane perpendicular to the principal optical axis of the microscope 100 (lateral plane; real space coordinates X, Y). This plane faces the specimen stage (the specimen stage is not illustrated in FIG. 3).

Instead of a matrix structure, the use of other geometric arrangements of the light sources 121-1, 121-2 would be possible in other examples, for example, ring-shaped arrangements, semi-circular arrangements, etc. In general, the light sources 121-1, 121-2 could be arranged in a grid structure.

In one example, the light sources 121-1, 121-2 could be implemented as lamps, for example as light-emitting diodes. Then, it would be possible, for example, for different light-emitting diodes with different luminous intensity to emit light for illuminating the test object. In this way, it is possible to implement an angle-variable illumination geometry. However, in a further implementation, the illumination module 111 could also be implemented as a spatial light modulator (SLM). In this way, an intervention can be undertaken in a condenser pupil in a spatially resolved manner; this may have a direct effect on the imaging.

FIG. 3 also illustrates twice the detector aperture 399 of the imaging optical unit 112. The light sources 121-1 that are arranged within twice the detector aperture 399—i.e., in the bright field—provide the bright-field illumination of the test object; the light sources 121-2 that are arranged outside of twice the detector aperture 399—i.e., in the dark field—form the dark-field illumination of the test object.

Figure 4:
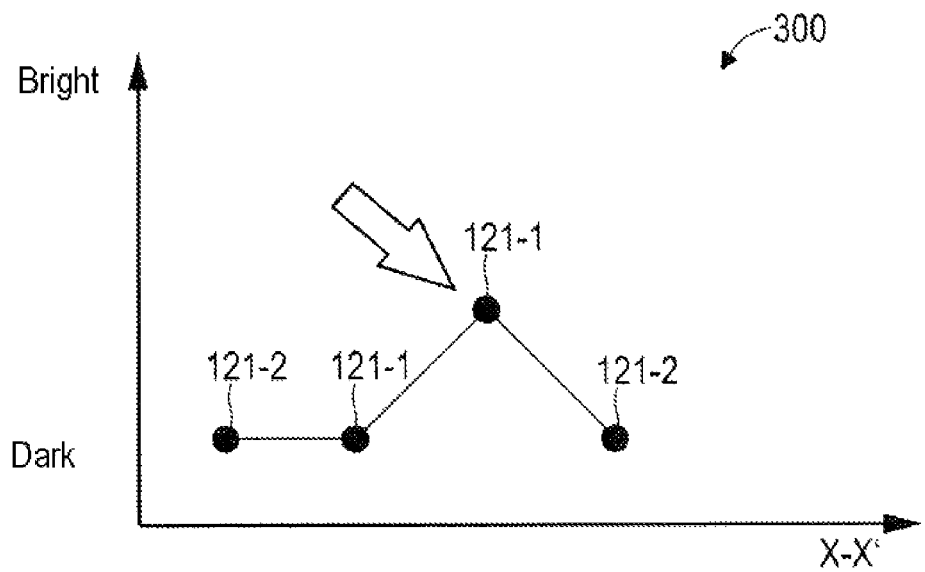
FIG. 4 schematically illustrates an illumination geometry for the angle-variable illumination according to various examples.

FIG. 4 illustrates aspects in relation to an exemplary illumination geometry. FIG. 4 illustrates the provided luminous intensity 301 for the various light sources 121-1, 121-2 along the axis X-X' of FIG. 3. The illumination geometry 300 is characterized by a dependence of the luminous intensity on the position along the X-axis; therefore, an angle-variable illumination is provided by the illumination geometry 300. In particular, the light is incident on the test object at an angle that is associated with the activated light source 121-1 (marked by an arrow in FIG. 4). Thus, the illumination geometry 300 comprises a corresponding illumination direction. Further details in the context of the illumination direction are described below in conjunction with FIG. 5.

Figure 5:
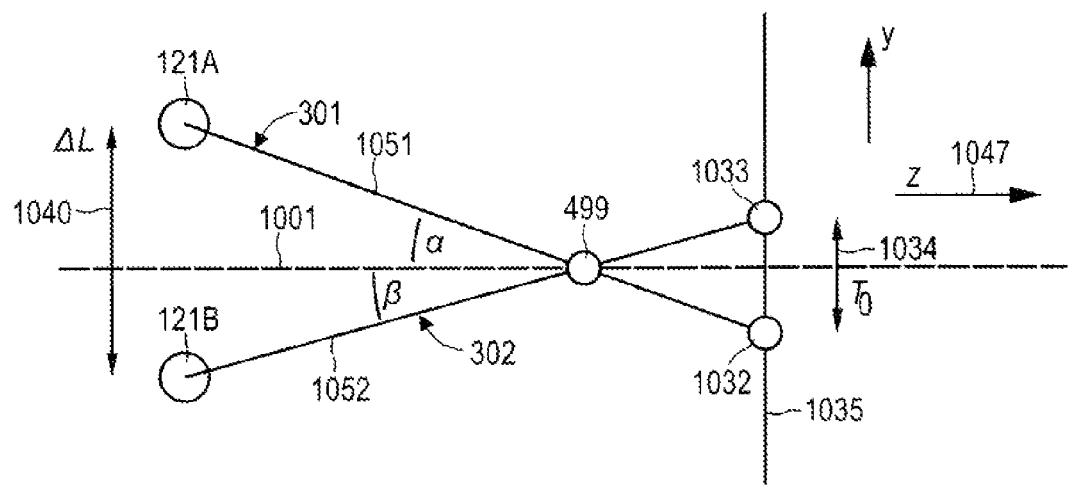
FIG. 5 schematically illustrates an object shift of a test object when using different illumination geometries.

FIG. 5 illustrates aspects in relation to different illumination directions 1051, 1052. FIG. 5 illustrates the illumination of a test object 499 from the illumination direction 1051; here, the illumination direction is associated with a light source 121A and corresponds to the illumination geometry 301. Moreover, FIG. 5 illustrates the illumination of the test object 499 from the illumination direction 1052; here, the illumination direction 1052 is associated with a light source 121B and corresponds to the illumination geometry 302.

In general, an illumination geometry may comprise more than a single illumination direction. By way of example, use could be made of line-shaped patterns of light sources such that a corresponding number of illumination directions is used for each illumination geometry (see FIGS. 6 and 8).

A reproduction 1032 of the test object 499 in the focal plane 1035 of the system emerges when the test object 499 is illuminated from the illumination direction 1051, said reproduction of the test object then being imaged on the detector 114. A reproduction 1033 of the test object 499 in the focal claim 1035 emerges when the test object 499 is illuminated from the illumination direction 1052. It is clear from FIG. 5 that the positions of the rerodutions 1032, 1033 are shifted by a distance 1034 (denoted by T; see Equations 2 and 3) (object shift).

Further, various system parameters are illustrated in FIG. 5. By way of example, the distance 1040, ΔL is illustrated between the light sources 121A and 121B; the distance 1040 can also serve as a measure for the distance between the illumination directions 1051, 1052. The illumination angles α, β could serve as a further measure for the distance between the illumination directions 1051, 1052, which illumination angles include the illumination directions 1051, 1052 with the principal optical axis 1001 (which is oriented along the Z-direction 1047).

Figure 6:
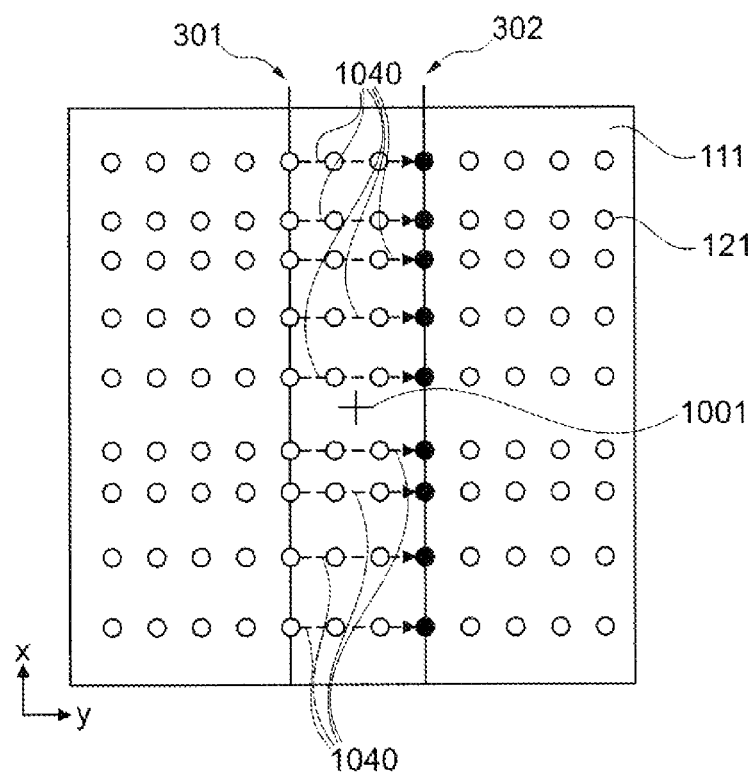
FIG. 6 schematically illustrates the use of two line-shaped illumination geometries according to various examples.

FIG. 6 illustrates aspects in relation to the illumination geometries 301, 302 of FIG. 5. Here, FIG. 6 illustrates the illumination module 111 with a multiplicity of light sources 121, which are arranged in the XY-plane in a matrix structure with a slightly variable unit cell on a corresponding carrier of the illumination module 111. The optical axis 1001 is oriented perpendicular to the plane of the drawing of FIG. 6.

It is clear from FIG. 6 that the illumination geometry 301 comprises the activation of a multiplicity of light sources 121 arranged in a line pattern; accordingly, the illumination geometry 302 comprises the actuation of a further multiplicity of light sources 121 arranged in a parallel line pattern. Therefore, the illumination geometries 301, 302 thus each implement a plurality of illumination directions 1051, 1052.

It is clear from FIG. 6 that the distances 1040 between the light sources 121 vary slightly on account of the slightly varying unit cell of the matrix structure. In particular, there is a variation in the distance 1040 between those light sources 121 that are closest neighbours and activated in different illumination geometries 301, 302. This variation of the distances 1040 yields a broadened correlation maximum. This is illustrated in more detail in the context of FIG. 7.

Figure 7:
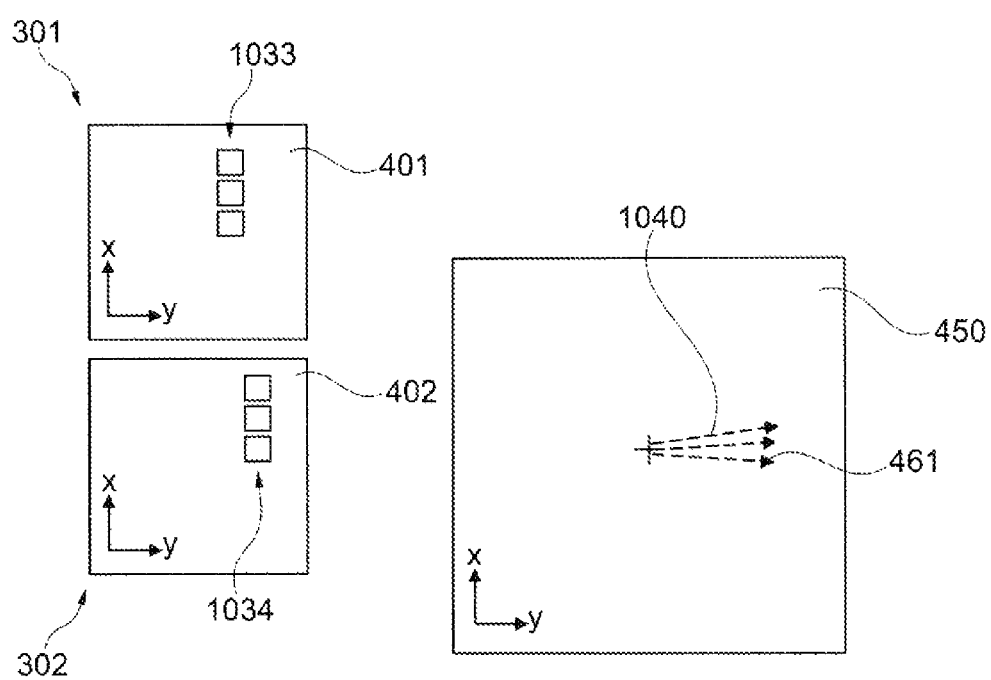
FIG. 7 schematically illustrates a 2-D correlation of image datasets, which were captured using the illumination geometries from FIG. 6.

FIG. 7 illustrates aspects in relation to image datasets 401, 402 and an associated 2-D cross-correlation. Initially, FIG. 7 illustrates the image datasets 401, 402 that are captured with the illumination geometries 301, 302. On account of the multiple illumination directions 1051, 1052, the test object 499 is imaged multiple times in each case: the corresponding reproductions 1033 and 1034 are arranged with an offset in the X-direction, i.e., along the line pattern of the illumination geometries 301, 302 (the offset in the X-direction has been greatly exaggerated in FIG. 7 for illustration purposes).

FIG. 7 also illustrates the 2-D cross-correlation 450 between image dataset 401 and image dataset 402, i.e., a corresponding correlation matrix (simply referred to as correlation below). It is clear in this case that the correlation maximum 461 is broadened in the X-direction on account of the varying distances 1040.

FIG. 7 only illustrates the first-order correlation maximum 461.

Figure 8:
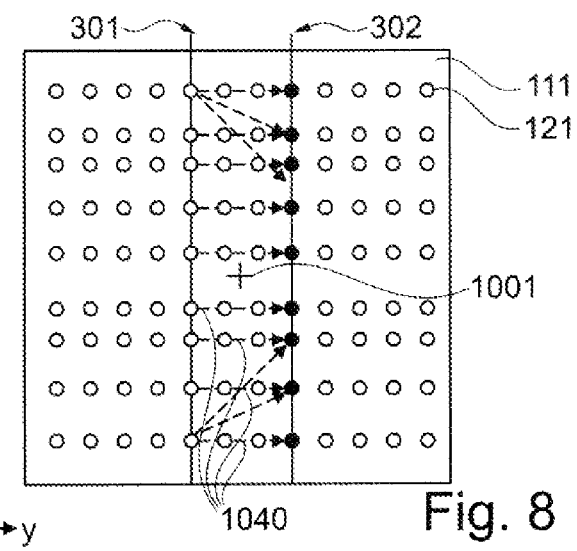
FIG. 8 schematically illustrates the use of two line-shaped illumination geometries according to various examples.

FIG. 8 illustrates aspects in relation to the illumination geometries 301, 302. In principle, FIG. 8 corresponds to the example of FIG. 6. However, in the example of FIG. 8, the light sources 121 are arranged on a regular grid without larger deviations in this case. Therefore, the correlation maximum 461 has not been broadened; see FIG. 9.

Figure 10:
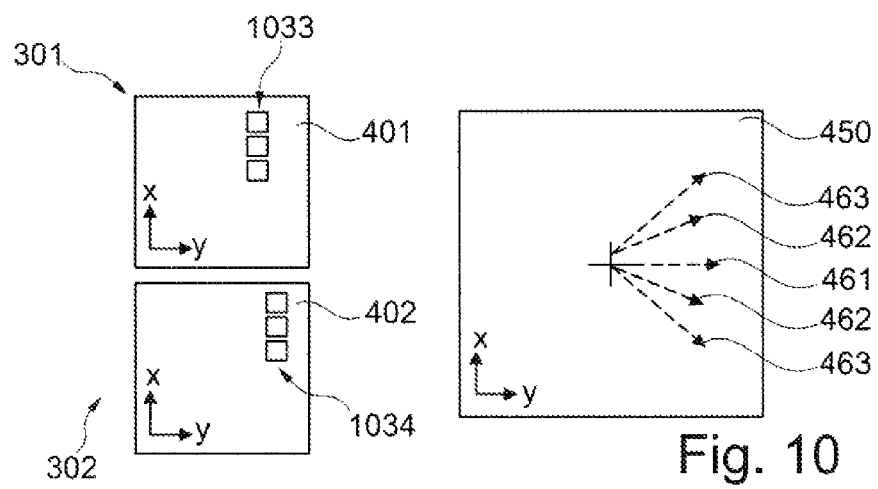
FIG. 10 schematically illustrates a 2-D correlation of image datasets, which were captured using the illumination geometries from FIG. 8.

FIG. 8, in turn, only illustrates the first-order correlation maximum 461. FIG. 10 also illustrates second- and third-order correlation maxima 462, 463. These correspond to the light sources 121 that are not the closest neighbours (see the diagonal dashed arrows in FIG. 8).

Figure 9:
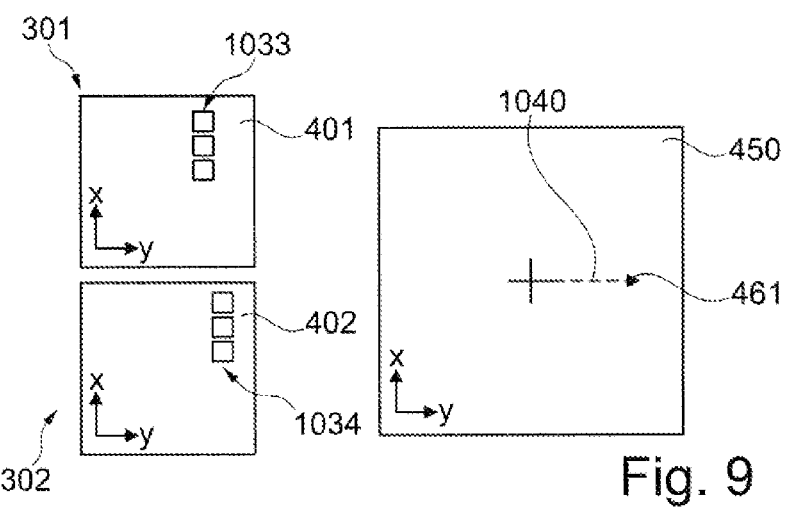
FIG. 9 schematically illustrates a 2-D correlation of image datasets, which were captured using the illumination geometries from FIG. 8.

In general, a superimposition of the signals of a plurality of closest-neighbour light sources 121 without great broadening of the first order correlation maximum 461 according to the implementation of FIGS. 8-10 may be desirable in order to obtain a particularly high signal-to-noise ratio. A further improvement in the signal-to-noise ratio can be obtained by taking account of the direction of the object shift, for example in conjunction with appropriate a priori knowledge. Such techniques are illustrated below in conjunction with FIG. 11.

Figure 11:
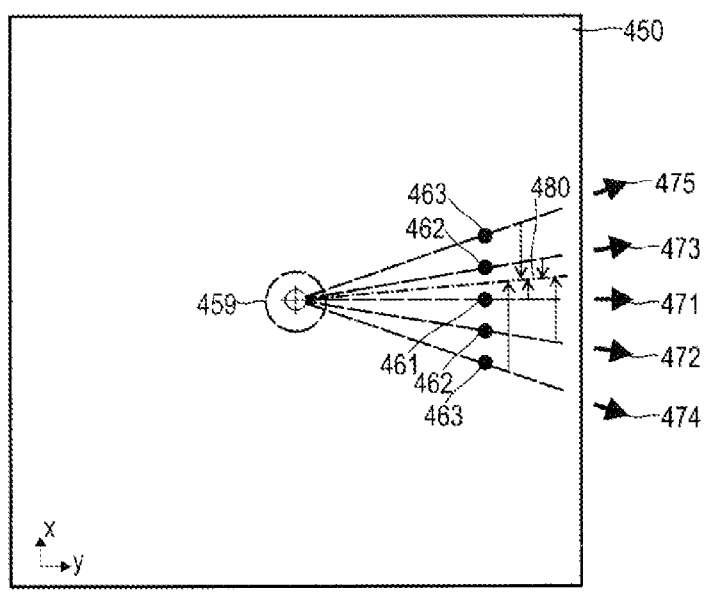
FIG. 11 schematically illustrates a 2-D correlation of image datasets, which were captured using the illumination geometries from FIG. 8, wherein FIG. 11 also illustrates the superimposition of data points of the 2-D correlation.

FIG. 11 illustrates the correlation 450 between image datasets 401, 402, which are associated with the illumination geometries 301, 302 according to FIG. 8. In principle, the scenario of FIG. 11 corresponds to the scenario of FIG. 9.

Here, FIG. 11 in each case illustrates the direction 471-475 of the expected object shift between the image datasets 401, 402. These directions 471-475 can be obtained as a priori knowledge by the connecting vectors between the respectively activated light sources 121 of the illumination module 111 (see arrows in FIG. 8) or, in general, on the basis of a relative positioning of the light sources 121 associated with the illumination geometries 301, 302. Then, it is possible to only select those data points of the correlation 450 that correspond to the directions 471-475 and to recognize the object shift on the basis of these selected data points. Expressed differently, this means that it is possible to select those data points of the correlation 450 that lie on the straight lines that emanate from the origin and are oriented in the corresponding directions 471-475 (dashed lines in FIG. 11).

In particular, the data points lying on the different straight lines can be combined with one another, i.e., superimposed on one another. This is possible by virtue of appropriate a priori knowledge about the directions 471-475 being available. This is illustrated in the context of FIG. 12A.

Figure 12A:
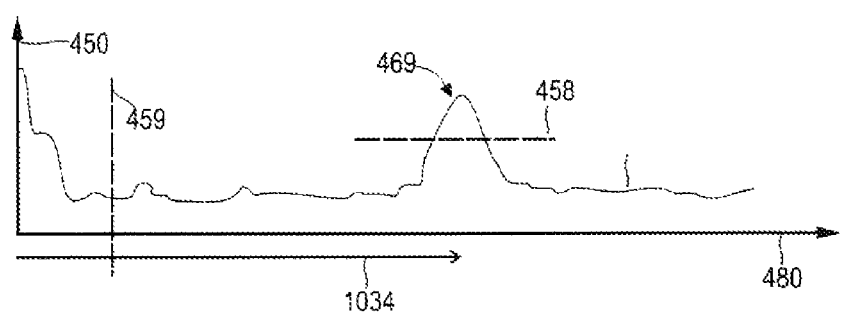
FIG. 12A illustrates further details of the superimposed data points of the 2-D correlation from FIG. 11.

FIG. 12A illustrates the data points of the correlation as a function of the position along the reference direction 480. In particular, a corresponding correlation maximum 469 is illustrated in FIG. 12A.

In the scenario of FIG. 12A, the data points of the correlation 450 that lie on the different straight lines—i.e., correspond to the different directions 471-475 of the object shift—are combined with one another, for example by virtue of the data points being projected onto the reference direction 480 (see the vertical arrows and dash-dotted line in FIG. 11). As a result, the signal-to-noise ratio between the signal on account of the object shift and the noise 492 can be improved further. Moreover, a 1-D evaluation with little complexity is possible, as illustrated in FIG. 12A.

As a general rule, the position of the correlation maxima 461-463 emerges as:

$$c_i = v_i \cdot \Delta z \frac{Mag}{L}, \quad (4)$$

Where $v_i$ is the distance vector between the light source pairs i=1, 2, 3, . . . (i.e., corresponds to the directions 471-475), $c_i$ is the position of the correlation maximum, $\Delta z$ is the defocus position of the test object, Mag is the magnification of an imaging optical unit (typically telecentric), and L is the distance between the illumination module and the test object.

The signal-to-noise ratio can be increased by converting the 2-D correlation 450 into a 1-D correlation—for example, by summing all paths i between light sources 121A, 121B activated in the illumination geometries 301, 302. What can be exploited here is that the object shift can only extend along the straight lines defined by the illumination module (dashed lines in FIG. 11) on account of the employed illumination geometries 301, 302. In order to undertake the transposition into the 1-D correlation by projection on the straight line defined by the reference direction 480, the distance vector of the involved light source pairs should be taken into account:

$$c_{1d} = \Sigma_i c_i e_{1d}, \quad (5)$$

where $e_{1d}$ is the direction vector of the reference straight line 480. The equation 5 can facilitate an equidistant projection onto the straight line 480.

Thus, what these techniques achieve is that all employed illumination intensities—even if these lead to secondary maxima of the correlation—are taken into account during the evaluation. Moreover, interference structures, which can be arranged anywhere in the correlation 450 and which lead to local maxima, provide a smaller contribution, or no contribution, to the 1-D correlation according to FIG. 12A because these are not taken into account in the summation along the straight lines of the directions 471-475. Moreover, the time-consuming and complicated evaluation of the correlation 450 in 2-D can be reduced to a 1-D problem that can be solved more quickly.

These techniques are based on the discovery that even the noise of the camera or self-similarities of the test object can lead to interference structures in the form of maxima in the correlation 450. The disjunct district structure of the illumination geometries 301, 302 can be used to strengthen the signal-to-noise ratio. To this end, use can be made of, for example, an LED matrix as an illumination module 111, in which individual LEDs can be switched separately and individually. Then, the test object can be illuminated from a small, restricted solid angle range by means of each individual LED. In order to avoid excessive widening of the corresponding angles of the illumination directions, the use of diffusion screens or other optical elements for broadening the angle spectrum can be avoided. Use can be made of sufficiently separated light-emitting diodes.

FIG. 11 and FIG. 12A also illustrate a threshold 459, which marks a lower limit for the object shift. Therefore, the threshold 459 is arranged in relation to the zero of the correlation 450. Correlation maxima within the threshold 459 are ignored during the evaluation. This is based on the discovery that such correlation maxima at small object shifts typically result from interference structures such as, for example, fixed-pattern noise of the detector or a bright background.

Figure 12B:
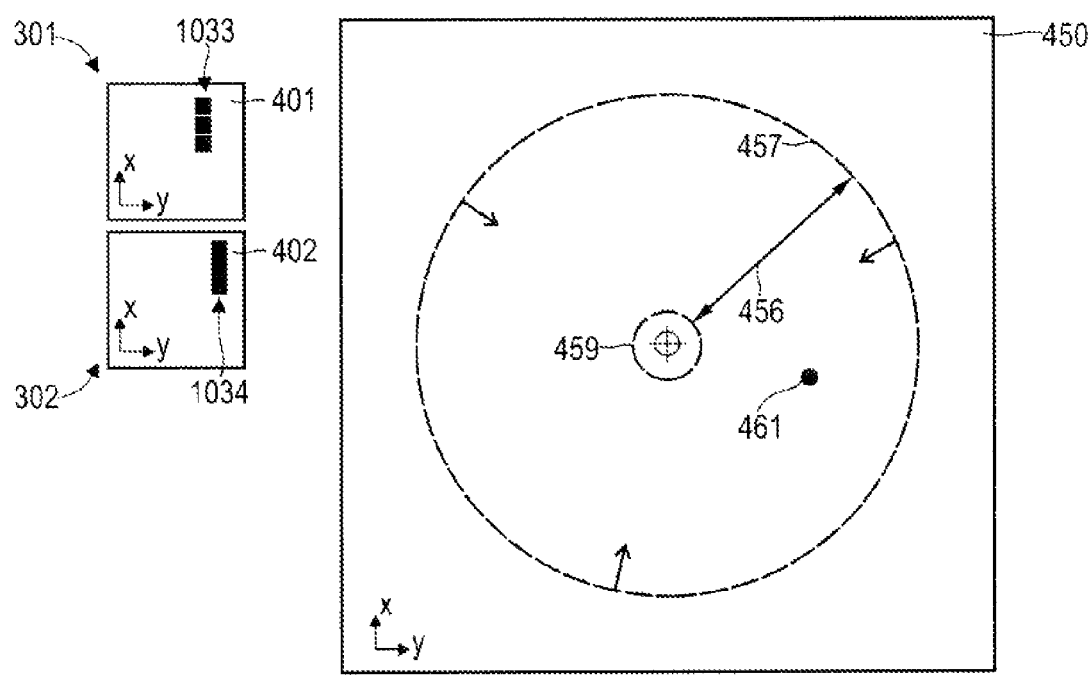
FIG. 12B schematically illustrates a 2-D correlation of image datasets, which were captured using the illumination geometries from FIG. 8, wherein FIG. 12B also illustrates a search region of the 2-D correlation.

FIG. 12B illustrates aspects in relation to the correlation 450. In principle, FIG. 12B corresponds to FIG. 11. Once again, the correlation 450 is formed by comparing image datasets 401, 402, which correspond to the illumination directions 301, 302. Here, in FIG. 12B, only the first order correlation maximum 461 of the reproduction positions 1033, 1034 of the test object 499 is illustrated for reasons of simplicity.

In the example of FIG. 12B, use is made of a priori knowledge, which comprises a search region 456 for the object shift 1034. Toward small object shifts 1034, the search region 456 is delimited by the threshold 459. The search region 456 is also delimited to large object shifts 1034 by a threshold 457. These are also predetermined by the a priori knowledge. Data points of the correlation 450 outside of the search region 456 are ignored. The threshold 459 defines a minimal recognizable object shift 1034 and the threshold 457 defines a maximal recognizable object shift 1034.

By way of example, it would be possible to adapt the search region 456—for example the upper threshold 457, in particular—as a function of the iteration 9010 (see FIG. 2). Thus, the a priori knowledge may comprise the search region 456 as a function of the iteration 9010. By way of example, it would be reasonable to expect that only a small defocus position of the test object 499 is present for later iterations 9010, for example on account of an own movement of the specimen or a temporal drift. This can be taken into account by virtue of choosing the upper threshold 457 to be comparatively small—for example, in comparison with initial iterations 9010, in which there may also be a large defocus position of the test object 499 on account of poor initial focusing. The continuous reduction in the upper threshold is denoted by the arrows in FIG. 12B.

As an alternative or in addition to such a dependence of the upper threshold 457 on the iteration 9010, it would also be possible for the a priori knowledge to comprise the search region 456—for example, the upper threshold 457, in particular—for different depths-of-field regions of the imaging optical unit 112 of the microscope 110. By way of example, the upper threshold 457 could be provided in parameterized fashion as a function of the depth-of-field region of the imaging optical unit 112.

Thus, various techniques were described above in conjunction with FIGS. 6-12B, which techniques facilitate a separation of the reproduction 1033, 1034 of the test object 499 from the interference structures 492 on the basis of the correlation 450. Such techniques can be replaced or complemented by further techniques for separating the reproduction 1033, 1034 of the test object 499 from the interference structures 492. A further exemplary technique is described in conjunction with FIG. 13, for example.

Figure 13:
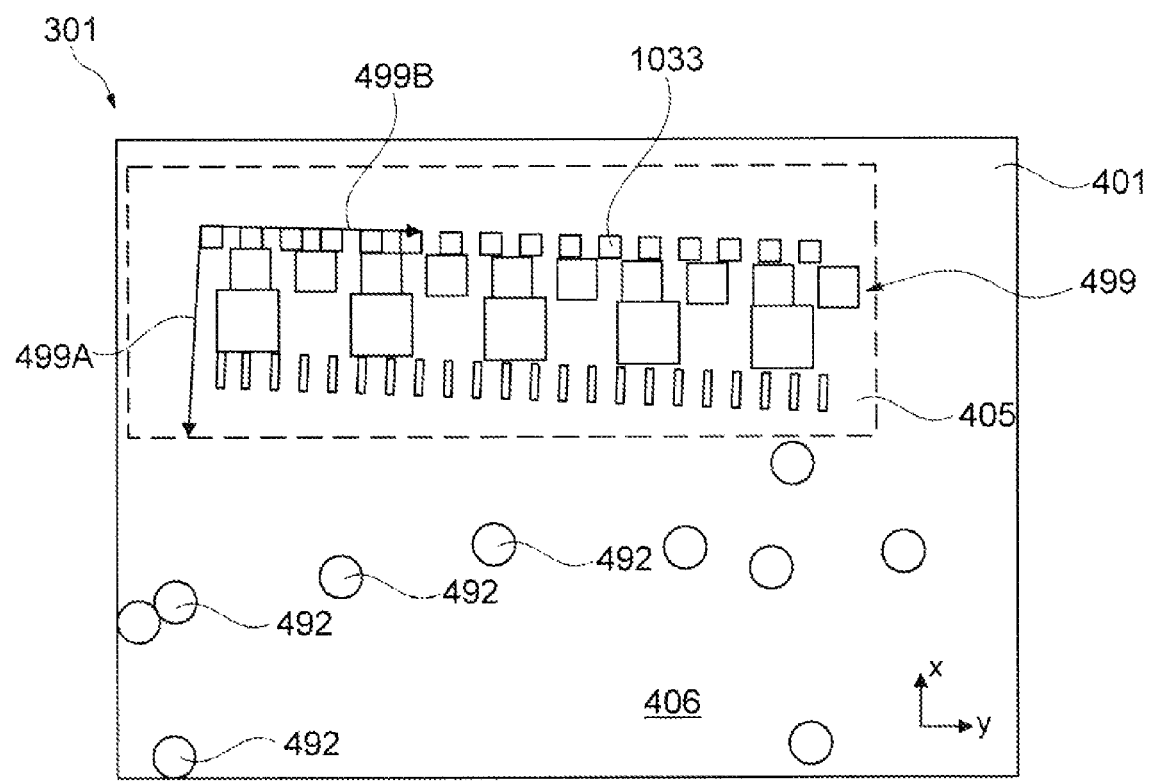
FIG. 13 schematically illustrates tiling of an image dataset according to various examples.

FIG. 13 illustrates aspects in relation to tiling of an image dataset 401. The test object 499—a technical, periodic structure with little contrast—is illustrated in image dataset 401. Moreover, interference structures 492 are visible. Use is made of a priori knowledge, which specifies the reproduction position of the interference structures 492 in image dataset 401. By way of example, corresponding control data could be obtained from a user of the microscope 100 via a user interface. The user could carry out an appropriate image dataset segmentation. However, alternatively or additionally, it would also be possible for corresponding control data to be obtained from a trained classifier, which operates on image dataset 401 and which is configured to recognize the reproduction positions of the interference structures 492 and/or the reproduction positions 1033 of the test object 499. Further, use could be made, for example, of a priori knowledge about the contrast of the interference structures 492 and/or about the contrast of the test object 499: this is because it is clear from FIG. 13 that the contrast for the interference structures 492 is stronger than for the test object 499. This can be exploited to recognize the reproduction positions of the interference structures 492 or the reproduction position of the test object 499.

Then, tiling is applied to the image dataset 401 depending on the repdocution positions of the interference structures 492 or of the test object 499 in the example of FIG. 13. An appropriate tile 405 is illustrated in FIG. 13 using the dashed line. The test object 499 is imaged within the tile 405; the complementary tile 406 comprises the interference structures 492. Then, an evaluation of the image dataset 401 can be suppressed in the tile 406. By way of example, the correlation 450 could be calculated merely on the basis of the pixels in the tile 405 but not on the basis of the pixels in the tile 406.

FIG. 13 also illustrates directions 499A, 499B, along which the test object 499 has a real space periodicity. The directions 499A, 499B of the real space periodicity can be available as a priori knowledge. In the context of the techniques described herein, it may be possible to choose the directions 471-475 (see FIG. 11) in such a way that these do not coincide with the directions 499A, 499B. This is because it is then possible to distinguish between correlation maxima on account of the real space periodicity of the test object 499 as interference structures in relation to the determination of the object shift and correlation maxima on account of the employed illumination geometries 301, 302. In order to inherently reach this, the employed illumination geometry 301, 302 can be adapted between successive iterations (see block 9008 in FIG. 2). Then, what can be achieved at least on average is that such a separation of real space periodicity of the test object 499 and object shift on account of the illumination geometries 301, 302 is achieved Additionally, the quality could be improved further by an active determination of the real space periodicity of the test object in the case of a defined arrangement of the test object 499—for example, determined by reference measurement or after manual focusing on the test object by the user. This means that the directions 499A, 499B can be actively measured, for example. Hence, the real space periodicity of the test object in the focus could be measured in a calibration phase in order then to be taken into account as background or damping in the evaluation of the correlation 450. Thus, the a priori knowledge can comprise a real space periodicity of the test object 499.

Figure 14:
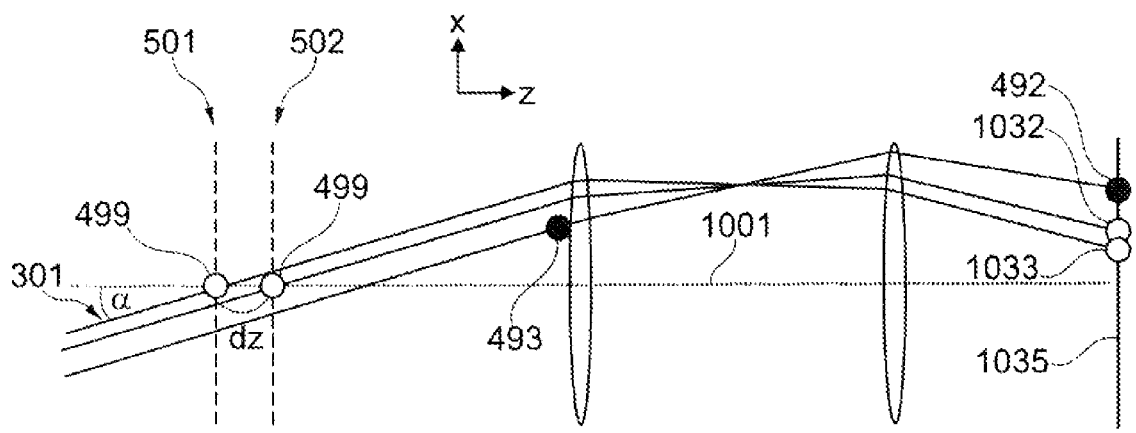
FIG. 14 schematically illustrates an interference structure which corresponds to a portion of an image dataset that is static in relation to a variation of the Z-position of a specimen stage of the microscope.

FIG. 14 illustrates techniques in relation to the variation of the Z-position 501, 502 of the specimen stage 113, and hence also of the test object 499 arranged on the specimen stage 113. In the example of FIG. 14, the test object 499 is illuminated throughout with an illumination geometry 301 that corresponds to a corresponding angle α (see also FIG. 5).

The position of the reproductions 1032, 1032 of the test object 499 changes when the Z-position 501, 502 is changed. On the other hand, however, the interference structure 492 as a reproduction of a dust particle 493, which is not fastened to the specimen stage 113, remains static/unchanged. Therefore, those components in the corresponding image dataset which remain static in relation to the variation of the Z-position 501, 502 can be identified as interference structures.

Here, use could be made, for example, of the iterative change of the Z-position 501, 502 according to block 9006 of FIG. 2 for the purposes of obtaining corresponding reference image datasets, which correspond to the different Z-positions 501, 502. This means that reference image datasets for deviating Z-positions 501, 502 can be obtained from one or more preceding iterations 9010. Alternatively, dedicated reference measurements—e.g., in a corresponding calibration phase—could also be carried out for the different Z-positions 501, 502 during an iteration 9010. Such a scenario is illustrated in the context of FIG. 15.

Figure 15:
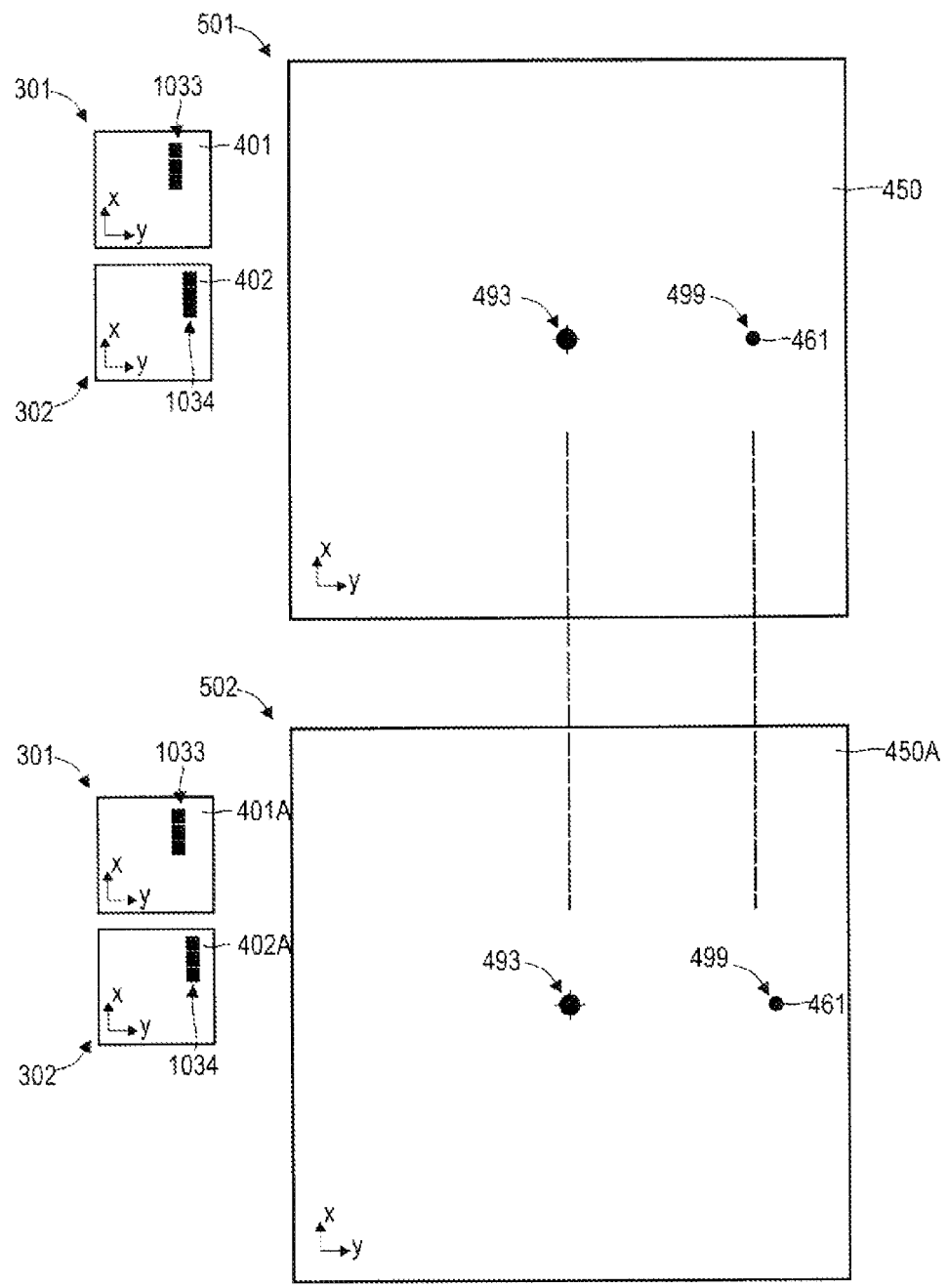
FIG. 15 schematically illustrates an image dataset of a test object which corresponds to a portion of an image dataset that changes in relation to a variation of the Z-position of a specimen stage of the microscope.

FIG. 15 illustrates 2-D correlations 450, which are formed between image datasets 401, 402 in two illumination geometries 301, 302. Here, the 2-D correlation 450 in FIG. 15, top, corresponds to the Z-position 501 and the 2-D correlation 450A in FIG. 15, bottom, corresponds to the Z-position 502. This means that the correlation 450A is formed for the reference image datasets 401A, 402A, while the correlation 450 is formed for the image datasets 401, 402, which are subsequently also used for the determination of the object shift 1034.

It is clear from a comparison of the correlations 450, 450A that the correlation maximum of the interference structure 493 does not change as a function of the Z-position 501, 502; however, the correlation maximum 461 of the test object 499 does change (FIG. 15 illustrates corresponding horizontal, dashed lines as aids for the eye).

This can be exploited to clean the correlation 450, i.e., to remove correlation maxima corresponding to the interference structure 493. This can be implemented by the following calculation:

$$\check{K}=K|K-K_{ref}|, \qquad (6)$$

where K denotes the correlation 450, $K_{ref}$ denotes the correlation 450A of the reference image datasets 401A, 402A, and $\check{K}$ denotes the corrected correlation. Then, proceeding from the corrected correlation, it is once again possible to use techniques as described above in relation to FIGS. 6-12 or FIG. 13, for example.

Figure 16:
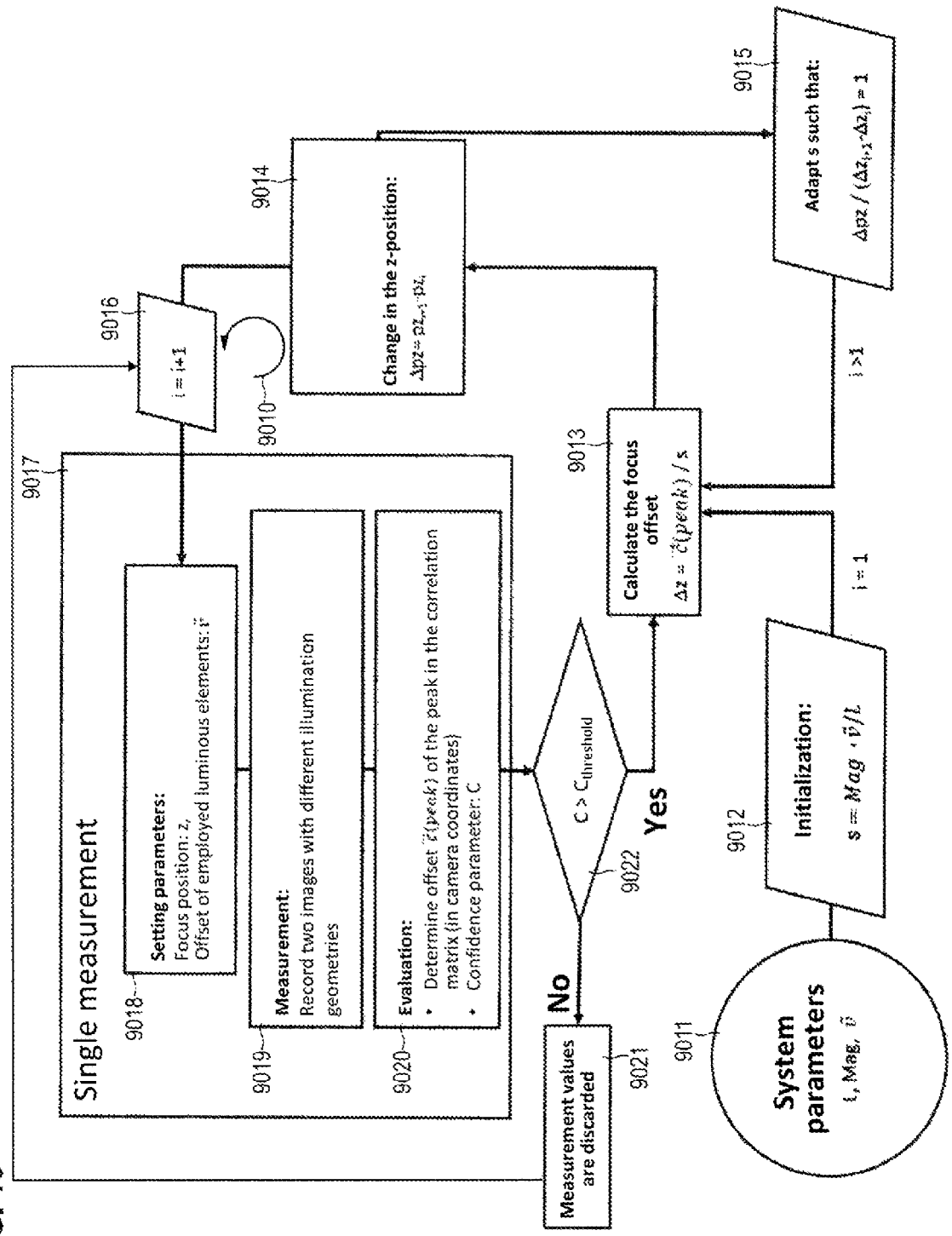
FIG. 16 is a flowchart of a method with a plurality of iterations according to various examples.

FIG. 16 is a flowchart of an exemplary method. FIG. 16 illustrates the use of one or more optical system parameters in the context of determining the defocus position. By way of example, that defocus position can be determined on the basis of the object shift and on the basis of values of one or more system parameters; see Equation 4 and block 9005.

This means that some of the techniques described herein are based on the knowledge about or accessibility of current values for the system parameters. Since system components of the microscope 100 are typically configured individually by a user interface, or else have individual differences from instrument to instrument, it may be helpful to undertake an update of the system parameters as soon as components of the microscope 100 are changed or newly adjusted. By way of example, system parameters can be adapted according to Equations 2, 3 or 4, in particular, i.e., for example, magnification and distance of the illumination module 111 from the specimen stage 113.

Here, in principle, very different techniques are available for the purposes of determining one or more such system parameters. In a first example, one or more system parameters can be determined from specifications of the hardware components of the microscope 100. By way of example, this relates to distances and positions of light sources 121, 121-1, 121-2 in the illumination module 111. Since the light sources are typically securely attached to a carrier of the illumination module 111, such system parameters—which may be helpful in conjunction with Equation 4 for the directions 471-475, for example—do not have a drift or have no significant drift, for example as a function of temperature or time. In a further example, it would be possible—alternatively or additionally—to carry out a systematic calibration, for example by means of suitable reference test objects. Finally, it is possible—alternatively or additionally—to determine one or more system parameters from current measurements by way of a suitable evaluation. Here, a self-consistent adaptation over a plurality of iterations 9010 (see FIG. 2), in particular, can be helpful.

Here, it may be desirable in such a scenario to avoid falsification of the self-consistent adaptation. By way of example, such falsifications may occur if the object shift 1034 is determined incorrectly. Therefore, it may be helpful to take account of a reliability or confidence level in relation to the identified object shift 1034. By way of example, this can be implemented in conjunction with a threshold 458 for the corresponding correlation maximum (see FIG. 12A). By way of example, a normalized signal level 450 for the correlation maximum 469 could be evaluated:

$$C = \frac{Cmax - Cmin}{Cmax} > C_{thres}, \quad (7)$$

where Cmax denotes signal value at the maximum 469, Cmin denotes the signal value at the minimum of the correlation 450 and $C_{thres}$ denotes the threshold 458.

If the threshold of 458 is undershot, an incorrect recognition of the object shift may be present, and so corresponding signal values should be discarded where appropriate and a renewed identification of the object shift should be carried out with a modified illumination geometry and/or a modified Z-position. Here, it is clear that a greater threshold 458—and hence greater reliability—can be ensured by the superimposition of the signal values of the correlation along the various directions 471-475 in the scenario of FIG. 12A as a result of the greater signal-to-noise ratio. However, in general, Equation 7 can also be implemented without such a superimposition of the signal values along the directions 471-475.

If the correlation maximum 469 was reliably found—for example, in particularly reliable fashion by taking account of the threshold 458; see Equation 7—then this can serve as a start for a self-consistent adaptation of the values of the system parameters. This is explained in conjunction with the method in FIG. 16. Here, standard values or initial values for the system parameters 9011 are initially detained within the scope of an initialization 9012. In the example of FIG. 16, the system parameters 9011 comprise the parameters from Equation 4. By way of example, the initialization 9012 could provide standard values on the basis of a configuration of the microscope 100. For instance, these could be loaded from a non-volatile system memory, for example from a boot partition or a firmware partition of the system memory.

A running index i is initialized in a first iteration 9010; see block 9016. By way of example i=0 could be initialized.

A measurement is carried out in 9017. It comprises setting a certain Z-position 501, 502 and illumination geometries 301, 302, i.e., in particular, the activated light sources 121, the distance 1040, and the directions 471-475 (see FIGS. 5-11); see block 9018.

Then, the image datasets 401, 402 are captured in block 9019 in the different illumination geometries 301, 302 or in accordance with the previously set settings (see also blocks 9001, 9002 of FIG. 2).

Then, the evaluation is implemented in block 9020; i.e., blocks 9003-9004 of FIG. 2 are carried out for example and the object shift 1034 is recognized.

Subsequently, a check is carried out in block 9022—an optional block, in general—as to whether the confidence level with which the object shift 1034 was recognized is sufficient. To this end, an evaluation according to Equation 7 could be carried out, for example.

If the confidence level does not suffice, the measurement values for the defocus position are discarded in block 9021 and there is an advance to the next iteration in block 9016. Then, the illumination geometry is adapted in the next iteration 9010 of block 9018 (see also block 9008 of FIG. 2) and/or the Z-position 501, 502 is optionally also changed, for example in random or incremental fashion.

Otherwise, the defocus position $\Delta z$ is determined in block 9013 (see block 9005 of FIG. 2), using the system parameters 9011 for i=0. By way of example, the values for the system parameters obtained from 9012 can be used in the initial iteration 9010 i=0. Then, the Z-position 501, 502 is set in block 9014 (see block 9006 of FIG. 2). By way of example, the Z-position 501, 502 could be set in such a way that the defocus position is nominally set to 0. The change in the Z-position 501, 502 is given by $\Delta pz = pz_{i+1} - pz_i$.

Then, the next iteration 9010, i→i+1, is triggered in block 9016.

Moreover, block 9015 is carried out. There, the change of the defocus position between two iterations is compared to the change in the Z-position 501, 502 between the two iterations, i.e., for example, for i and i+1. By way of example, the calculated value of the defocus position from two iterations 9010 can be subtracted ($\Delta z_{i+1} - \Delta z_i$) by block 9013 in each case and said value can be compared to the change in the Z-position 501, 502, indicated by the control data of the specimen stage 113, from these iterations 9010 by block 9014 ($\Delta pz = pz_{i-1} - pz_i$). If there is a deviation between the change in the defocus position and the change in the Z-position 501, 502 with the current system parameters, i.e., if $\Delta pz / (\Delta z_{i-1} - \Delta z_i) \neq 1$, there can be a self-consistent adaptation of the system parameters, for example in such a way that $\Delta pz / (\Delta z_{i-1} - \Delta z_i) = 1$ or else by another incremental approximation. This is based on the discovery that it may be desirable to log the changes in the recording parameters for reliable results of the object shift in order to obtain an accurate relationship between object shift and defocus position, on the one hand, and repositioning of the specimen stage, on the other hand, for a current configuration of the microscope 100.

Then, in 9013, the adapted value of the system parameters is used in subsequent iterations 9010.

In summary, various techniques were described above, which facilitate autofocus applications by digital post-processing of image datasets that were captured with angle-variable illumination geometries. These techniques render it possible to determine the defocussed position of the test object in a particularly robust and swift manner. By way of example, this allows long-term measurements to be carried out reliably.

Summarizing, the following examples have been described above:

Example 1

A method for operating a microscope (100), said method comprising:
 capturing at least one image dataset (401, 402, 401A, 402A) in a multiplicity of angle-variable illumination geometries (300-302),
 on the basis of control data indicative for a priori knowledge: carrying out a separation of a reproduction (1032, 1033) of a test object (499) from interference structures (492, 493) in the at least one image dataset (401, 402, 401A, 402A),
on the basis of the separation: recognizing components in the at least one image dataset (401, 402, 401A, 402A) that change in relation to a change in the angle-variable illumination geometry as an object shift (1034) of the test object (499),
on the basis of the object shift (1034): determining a defocus position of the test object (499), and
on the basis of the defocus position: setting a Z-position (501, 502) of a specimen stage (113) of the microscope (100).

Example 2

The method according to Example 1,
wherein the a priori knowledge comprises at least one direction (471-475) of the object shift (1034) in the at least one image dataset (401, 402, 401A, 402A).

Example 3

The method according to Example 2, furthermore comprising:
carrying out a correlation (450, 450A) of the at least one image dataset (401, 402, 401A, 402A), and
selecting data points of the correlation (450, 450A) that correspond to the at least one direction (471-475) of the object shift (1034),
wherein the object shift (1034) is recognized on the basis of the selected data points.

Example 4

The method according to Example 3, furthermore comprising:
selecting first data points of the correlation (450, 450A) that correspond to a first direction (471-475) of the at least one direction (471-475),
selecting second data points of the correlation (450, 450A) that correspond to a second direction (471-475) of the at least one direction (471-475), and
superimposing the first data points and the second data points,
wherein the object shift (1034) is recognized on the basis of the selected and superimposed data points.

Example 5

The method according to any one of Examples 2-4, furthermore comprising:
determining the at least one direction (471-475) of the object shift (1034) on the basis of a relative positioning of light sources (121, 121-1, 121-2, 121A, 121B) of an illumination module (111) of the microscope (100), said light sources being associated with a multiplicity of angle-variable illumination geometries (300-302).

Example 6

The method according to any one of the preceding Examples,
wherein the a priori knowledge comprises a search region (456, 457, 459) for the object shift (1034).

Example 7

The method according to Example 6,
wherein capturing the at least one image dataset (401, 402, 401A, 402A) in the multiplicity of variable-angle illumination geometries (300-302) and, associated therewith, setting the Z-position (501, 502) is carried out repeatedly for a multiplicity of iterations (9010),
wherein the a priori knowledge comprises the search region (456, 457, 459) as a function of the iteration (9010).

Example 8

The method according to Example 6 or 7,
wherein the a priori knowledge comprises the search region (456, 457, 459) for different depth-of-field ranges of an imaging optical unit (113) of the microscope (100).

Example 9

The method according to any one of the preceding Examples,
wherein the a priori knowledge comprises at least one of reproduction positions of the interference structures (492, 493) and a reproduction position of the test object (499) in the at least one image dataset (401, 402, 401A, 402A).

Example 10

The method according to Example 9, furthermore comprising:
depending on the reproduction positions of the interference structures (492, 493): applying tiling (405, 406) to the at least one image dataset (401, 402, 401A, 402A), and
suppressing an evaluation of the at least one image dataset (401, 402, 401A, 402A) in image dataset tiles of the tiling (405, 406) that contain the interference structures (492, 493).

Example 11

The method according to any one of the preceding Examples,
wherein the a priori knowledge comprises at least one of a contrast of the interference structures (492, 493) and a contrast of the reproduction (1032, 1033) of the test object (499) in the at least one image dataset (401, 402, 401A, 402A).

Example 12

The method according to Example 11, furthermore comprising:
carrying out a correlation (450, 450A) of the at least one image dataset (401, 402, 401A, 402A),
recognizing at least one correlation maximum (461-463, 469) in the correlation (450, 450A), and
on the basis of the contrast of the interference structures (492, 493): discarding the at least one correlation maximum (461-463, 469).

Example 13

The method according to any one of the preceding Examples,
wherein the a priori knowledge comprises a real space periodicity (499A, 499B) of the test object (499).

Example 14

The method according to any one of the preceding Examples, furthermore comprising:
receiving the control data from a user interface of the microscope (100).

Example 15

The method according to any one of the preceding Examples, furthermore comprising:
receiving the control data from a trained classifier, which operates on the at least one image dataset (401, 402, 401A, 402A).

Example 16

A method for operating a microscope (100), said method comprising:
capturing at least one image dataset (401, 402, 401A, 402A) in a multiplicity of angle-variable illumination geometries (300-302),
capturing a multiplicity of reference image datasets (401, 402, 401A, 402A) in a multiplicity of Z-positions of a specimen stage (113) of the microscope (100),
recognizing components in the multiplicity of reference image datasets (401, 402, 401A, 402A) that are static in relation to a variation of the Z-position (501, 502), as interference structures (492, 493),
carrying out a separation of a reproduction (1032, 1033) of a test object (499) from the recognized interference structures (492, 493) in the at least one image dataset (401, 402, 401A, 402A),
on the basis of the separation: recognizing components in the at least one image dataset (401, 402, 401A, 402A) that change in relation to a change in the angle-variable illumination geometry, as an object shift (1034) of the test object (499),
on the basis of the object shift (1034): determining a defocus position of the test object (499), and
on the basis of the defocus position: setting a Z-position (501, 502) of a specimen stage (113) of the microscope (100).

Example 17

The method according to Example 16, wherein the method furthermore comprises:
carrying out a correlation (450, 450A) of the at least one image dataset (401, 402, 401A, 402A),
carrying out a correlation (450, 450A) of the multiplicity of reference image datasets, and
comparing the correlation (450, 450A) of the at least one image dataset (401, 402, 401A, 402A) with the correlation (450, 450A) of the multiplicity of reference image datasets (401, 402, 401A, 402A), wherein the interference structures (492, 493) are recognized on the basis of these comparisons.

Example 18

The method according to Example 16 or 17,
wherein capturing the at least one image dataset (401, 402, 401A, 402A) in the multiplicity of angle-variable illumination geometries (300-302) and, associated therewith, setting the Z-position (501, 502) is carried out repeatedly for a multiplicity of iterations (9010),
wherein the multiplicity of reference image datasets (401, 402, 401A, 402A) for a subsequent iteration (9010) of the multiplicity of iterations (9010) is obtained on the basis of the at least one image dataset (401, 402, 401A, 402A) of one or more preceding iterations (9010) of the multiplicity of iterations (9010).

Example 19

A method for operating a microscope (100),
wherein the method, for each iteration (9010) of a multiplicity of iterations (9010), comprises:
capturing at least one image dataset (401, 402, 401A, 402A) in a multiplicity of angle-variable illumination geometries (300-302),
recognizing components in the at least one image dataset (401, 402, 401A, 402A) that change in relation to a change in the angle-variable illumination geometry, as an object shift (1034) of a test object (499),
on the basis of the object shift (1034): determining a defocus position of the test object (499), and
on the basis of the defocus position: setting a Z-position (501, 502) of a specimen stage (113) of the microscope (100),
wherein the method furthermore comprises:
adapting the multiplicity of angle-variable illumination geometries (300-302) between successive iterations (9010) of the multiplicity of iterations (9010).

Example 20

The method according to Example 19,
wherein the multiplicity of angle-variable illumination geometries (300-302) are adapted in such a way that a direction (471-475) of the object shift (1034) is changed.

Example 21

The method according to Example 19 or 20,
wherein the multiplicity of angle-variable illumination geometries (300-302) are adapted in such a way that a magnitude of the object shift (1034) per unit length of the defocus position is changed.

Example 22

The method according to Example 21,
wherein the magnitude of the object shift (1034) per unit length of the defocus position is increased for subsequent iterations (9010).

Example 23

A method for operating a microscope (100),
wherein the method, for each iteration (9010) of a multiplicity of iterations (9010), comprises:
capturing at least one image dataset (401, 402, 401A, 402A) in a multiplicity of angle-variable illumination geometries (300-302),
recognizing components in the at least one image dataset (401, 402, 401A, 402A) that change in relation to a change in the angle-variable illumination geometry, as an object shift (1034) of a test object (499),
on the basis of the object shift (1034): determining a defocus position of the test object (499), and on the basis of the defocus position: setting a Z-position (501, 502) of a specimen stage (113) of the microscope (100), wherein the method furthermore comprises:

on the basis of the recognized object shifts (1034) for two iterations (9010) of the multiplicity of iterations (9010): determining a change in the defocus position of the test object (499) between the two iterations (9010), on the basis of the control data of the specimen stage (113) of the microscope (100): determining a change in the Z-position (501, 502) of the specimen stage (113) between the two iterations (9010), and comparing the change in the defocus position with the change in the Z-position (501, 502).

Example 24

The method according to Example 23, wherein the defocus position of the test object (499) is furthermore determined on the basis of at least one optical system parameter (9011) of the microscope (100).

Example 25

The method according to Example 24, wherein the at least one optical system parameter (9011) is selected from the following group: magnification; and spacing of an illumination module (111) of the microscope (100) from the specimen stage (113).

Example 26

The method according to Example 24 or 25, furthermore comprising:

on the basis of the comparison: self-consistently adapting the at least one optical system parameter (9011) for one or more subsequent iterations (9010) of the multiplicity of iterations (9010).

Example 27

A control unit for a microscope, comprising a logic circuit configured to carry out the following steps:

capturing at least one image dataset (401, 402, 401A, 402A) in a multiplicity of angle-variable illumination geometries (300-302), on the basis of control data indicative for a priori knowledge: carrying out a separation of a reproduction (1032, 1033) of a test object (499) from interference structures (492, 493) in the at least one image dataset (401, 402, 401A, 402A), on the basis of the separation: recognizing components in the at least one image dataset (401, 402, 401A, 402A) that change in relation to a change in the angle-variable illumination geometry, as an object shift (1034) of the test object (499), on the basis of the object shift (1034): determining a defocus position of the test object (499), and on the basis of the defocus position: setting a Z-position (501, 502) of a specimen stage (113) of the microscope (100).

Example 28

The control unit according to Example 27, wherein the logic circuit is configured to carry out the method according to any one of Examples 1-15.

Example 29

A control unit for a microscope, comprising a logic circuit configured to carry out the following steps:

capturing at least one image dataset (401, 402, 401A, 402A) in a multiplicity of angle-variable illumination geometries (300-302), capturing a multiplicity of reference image datasets (401, 402, 401A, 402A) in a multiplicity of Z-positions of a specimen stage (113) of the microscope (100), recognizing components in the multiplicity of reference image datasets (401, 402, 401A, 402A) that are static in relation to a variation of the Z-position (501, 502) as interference structures (492, 493), carrying out a separation of a reproduction (1032, 1033) of a test object (499) from the recognized interference structures (492, 493) in the at least one image dataset (401, 402, 401A, 402A), on the basis of the separation: recognizing components in the at least one image dataset (401, 402, 401A, 402A) that change in relation to a change in the angle-variable illumination geometry, as an object shift (1034) of the test object (499), on the basis of the object shift (1034): determining a defocus position of the test object (499), and on the basis of the defocus position: setting a Z-position (501, 502) of a specimen stage (113) of the microscope (100).

Example 30

The control unit according to Example 29, wherein the logic circuit is configured to carry out the method according to any one of Examples 16-18.

Example 31

A control unit for a microscope, comprising a logic circuit configured to carry out the following steps:

capturing at least one image dataset (401, 402, 401A, 402A) in a multiplicity of angle-variable illumination geometries (300-302), recognizing components in the at least one image dataset (401, 402, 401A, 402A) that change in relation to a change in the angle-variable illumination geometry, as an object shift (1034) of a test object (499), on the basis of the object shift (1034): determining a defocus position of the test object (499), and on the basis of the defocus position: setting a Z-position (501, 502) of a specimen stage (113) of the microscope (100), wherein the method furthermore comprises:

adapting the multiplicity of angle-variable illumination geometries (300-302) between successive iterations (9010) of the multiplicity of iterations (9010).

Example 32

The control unit according to Example 31, wherein the logic circuit is configured to carry out the method according to any one of Examples 19-22.

Example 33

A control unit for a microscope, comprising a logic circuit configured to carry out the following steps:

capturing at least one image dataset (401, 402, 401A, 402A) in a multiplicity of angle-variable illumination geometries (300-302), recognizing components in the at least one image dataset (401, 402, 401A, 402A) that change in relation to a change in the angle-variable illumination geometry as an object shift (1034) of a test object (499), on the basis of the object shift (1034): determining a defocus position of the test object (499), and on the basis of the defocus position: setting a Z-position (501, 502) of a specimen stage (113) of the microscope (100), wherein the method furthermore comprises:

on the basis of the recognized object shifts (1034) for two iterations (9010) of the multiplicity of iterations (9010): determining a change in the defocus position of the test object (499) between the two iterations (9010), on the basis of the control data of the specimen stage (113) of the microscope (100): determining a change in the Z-position (501, 502) of the specimen stage (113) between the two iterations (9010), and comparing the change in the defocus position with the change in the Z-position (501, 502).

Example 34

The control unit according to Example 33, wherein the logic circuit is configured to carry out the method according to any one of Examples 23-26.

It goes without saying that the features of the embodiments and aspects of the invention described above can be combined with one another. In particular, the features can be used not only in the combinations described but also in other combinations or on their own without departing from the scope of the invention.

By way of example, various techniques were described above, in which raw image datasets were used without pre-processing. However, it may be possible, in this case, for pre-processing to be implemented in the various examples. By way of example, a mean contrast could be subtracted from the various pixels of an image dataset, etc. Other pre-processing techniques can be taken into account in the context of capturing the at least one image dataset.

What is claimed is:

1. A method for operating a microscope, said method comprising:

capturing at least one image dataset in a multiplicity of angle-variable illumination geometries, on the basis of control data indicative for a priori knowledge, carrying out a separation of a reproduction of a test object from interference structures in the at least one image dataset, on the basis of the separation, recognizing components in the at least one image dataset that change in relation to a change in the angle-variable illumination geometry as an object shift of the test object, on the basis of the object shift, determining a defocus position of the test object, and on the basis of the defocus position, setting a Z-position of a specimen stage of the microscope.

2. The method according to claim 1, wherein the a priori knowledge comprises at least one direction of the object shift in the at least one image dataset.

3. The method according to claim 2, further comprising:

carrying out a correlation of the at least one image dataset, and selecting data points of the correlation that correspond to the at least one direction of the object shift, wherein the object shift is recognized on the basis of the selected data points.

4. The method according to claim 3, further comprising:

selecting first data points of the correlation that correspond to a first direction of the at least one direction, selecting second data points of the correlation that correspond to a second direction of the at least one direction, and superimposing the first data points and the second data points, wherein the object shift is recognized on the basis of the first and second data points that were selected and superimposed.

5. The method according to claim 2, further comprising:

determining the at least one direction of the object shift on the basis of a relative positioning of light sources of an illumination module of the microscope, wherein the light sources are associated with a multiplicity of angle-variable illumination geometries.

6. The method according to claim 1, wherein the a priori knowledge comprises a search region for the object shift.

7. The method according to claim 6, wherein capturing the at least one image dataset in the multiplicity of variable-angle illumination geometries and, associated therewith, setting the Z-position is carried out repeatedly for a multiplicity of iterations, and wherein the a priori knowledge comprises the search region as a function of the iteration.

8. The method according to claim 6, wherein the a priori knowledge comprises the search region for different depth-of-field ranges of an imaging optical unit of the microscope.

9. The method according to claim 1, wherein the a priori knowledge comprises at least one of reproduction positions of the interference structures or a reproduction position of the test object in the at least one image dataset.

10. The method according to claim 9, further comprising:

depending on the reproduction positions of the interference structures, applying tiling to the at least one image dataset, and suppressing an evaluation of the at least one image dataset in image dataset tiles of the tiling that contain the interference structures.

11. The method according to claim 1, wherein the a priori knowledge comprises at least one of a contrast of the interference structures or a contrast of the reproduction of the test object in the at least one image dataset.

12. The method according to claim 11, further comprising:

carrying out a correlation of the at least one image dataset, recognizing at least one correlation maximum in the correlation, and on the basis of the contrast of the interference structures, discarding the at least one correlation maximum.

13. The method according to claim 1, wherein the a priori knowledge comprises a real space periodicity of the test object.

14. The method according to claim 1, further comprising:

receiving the control data from at least one of a user interface of the microscopy or a trained classifier, which operates on the at least one image dataset.

15. A method for operating a microscope, said method comprising:
- capturing at least one image dataset in a multiplicity of angle-variable illumination geometries,
- capturing a multiplicity of reference image datasets in a multiplicity of Z-positions of a specimen stage of the microscope,
- recognizing components in the multiplicity of reference image datasets that are static in relation to a variation of the Z-position, as interference structures,
- carrying out a separation of a reproduction of a test object from the interference structures that were recognized in the at least one image dataset,
- on the basis of the separation, recognizing components in the at least one image dataset that change in relation to a change in the angle-variable illumination geometry, as an object shift of the test object,
- on the basis of the object shift, determining a defocus position of the test object, and
- on the basis of the defocus position, setting a Z-position of a specimen stage of the microscope.

16. The method according to claim 15, wherein the method further comprises:
- carrying out a correlation of the at least one image dataset,
- carrying out a correlation of the multiplicity of reference image datasets, and
- comparing the correlation of the at least one image dataset with the correlation of the multiplicity of reference image datasets,
- wherein the interference structures are recognized on the basis of the comparing.

17. The method according to claim 16,
- wherein capturing the at least one image dataset in the multiplicity of angle-variable illumination geometries and, associated therewith, setting the Z-position is carried out repeatedly for a multiplicity of iterations,
- wherein the multiplicity of reference image datasets for a subsequent iteration of the multiplicity of iterations is obtained on the basis of the at least one image dataset of one or more preceding iterations of the multiplicity of iterations.

18. A method for operating a microscope, wherein the method, for each iteration of a multiplicity of iterations, comprises:
- capturing at least one image dataset in a multiplicity of angle-variable illumination geometries;
- recognizing components in the at least one image dataset that change in relation to a change in the angle-variable illumination geometry, as an object shift of a test object;
- on the basis of the object shift, determining a defocus position of the test object; and
- on the basis of the defocus position, setting a Z-position of a specimen stage of the microscope,
- wherein the method further comprises:
- adapting the multiplicity of angle-variable illumination geometries between successive iterations of the multiplicity of iterations.

19. The method according to claim 18,
- wherein the multiplicity of angle-variable illumination geometries are adapted such that at least one of a direction of the object shift or a magnitude of the object shift per unit length of the defocus position is changed.

20. A method for operating a microscope,
- wherein the method, for each iteration of a multiplicity of iterations, comprises:
- capturing at least one image dataset in a multiplicity of angle-variable illumination geometries;
- recognizing components in the at least one image dataset that change in relation to a change in the angle-variable illumination geometry, as an object shift of a test object;
- on the basis of the object shift, determining a defocus position of the test object; and
- on the basis of the defocus position, setting a Z-position of a specimen stage of the microscope,
- wherein the method further comprises:
- on the basis of the object shifts that are recognized for two iterations of the multiplicity of iterations, determining a change in the defocus position of the test object between the two iterations;
- on the basis of the control data of the specimen stage of the microscope, determining a change in the Z-position of the specimen stage between the two iterations; and
- comparing the change in the defocus position with the change in the Z-position.

21. The method according to claim 20,
- wherein the defocus position of the test object is further determined on the basis of at least one optical system parameter of the microscope.

22. The method according to claim 21, further comprising:
- on the basis of the comparing, self-consistently adapting the at least one optical system parameter for one or more subsequent iterations of the multiplicity of iterations.

* * * * *

UNITED STATES PATENT AND TRADEMARK OFFICE
CERTIFICATE OF CORRECTION

PATENT NO. : 10,955,653 B2  Page 1 of 1
APPLICATION NO. : 16/367789
DATED : March 23, 2021
INVENTOR(S) : Stoppe et al.

It is certified that error appears in the above-identified patent and that said Letters Patent is hereby corrected as shown below:

On the Title Page

Item [73], delete "Cad Zeiss" and insert -- Carl Zeiss --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*